(12) United States Patent  (10) Patent No.: US 8,700,454 B2
Fukuda et al.  (45) Date of Patent: Apr. 15, 2014

(54) INTERACTIVE PRIVILEGE SUPPLY SYSTEM

(75) Inventors: Kazuhiro Fukuda, Kanagawa (JP); Tetsuo Maruyama, Tokyo (JP)

(73) Assignee: Sony Corporation (JP)

( * ) Notice: Subject to any disclaimer, the term of this patent is extended or adjusted under 35 U.S.C. 154(b) by 1595 days.

(21) Appl. No.: 10/739,442

(22) Filed: Dec. 18, 2003

(65) Prior Publication Data

US 2004/0143840 A1  Jul. 22, 2004

(30) Foreign Application Priority Data

Jan. 17, 2003 (JP) .................... P2003-010378
Feb. 26, 2003 (JP) .................... P2003-049888

(51) Int. Cl.
*H04N 7/16* (2011.01)
*G06G 5/00* (2006.01)
*H04N 7/173* (2011.01)

(52) U.S. Cl.
USPC ............. 705/14.12; 725/23; 725/34; 725/113

(58) Field of Classification Search
USPC ............. 705/14, 14.12; 725/42, 113, 23, 34
See application file for complete search history.

(56) References Cited

U.S. PATENT DOCUMENTS

| | | | | |
|---|---|---|---|---|
| 5,791,991 | A | * | 8/1998 | Small .......................... 463/41 |
| 6,009,411 | A | * | 12/1999 | Kepecs ..................... 705/14.17 |
| 7,577,978 | B1 | * | 8/2009 | Wistendahl et al. .......... 725/113 |
| 2002/0083437 | A1 | * | 6/2002 | Fiore et al. .................... 725/23 |
| 2002/0133405 | A1 | * | 9/2002 | Newnam et al. ............... 705/14 |
| 2002/0147645 | A1 | * | 10/2002 | Alao et al. ..................... 705/14 |
| 2002/0147656 | A1 | * | 10/2002 | Tam et al. ...................... 705/26 |
| 2003/0115602 | A1 | * | 6/2003 | Knee et al. .................... 725/42 |

FOREIGN PATENT DOCUMENTS

| | | | |
|---|---|---|---|
| EP | 1215901 | 6/2002 | ........... H04N 7/16 |
| GB | 2370946 | 7/2002 | ........... H04N 7/173 |
| JP | 2001-144700 | 5/2001 | |
| JP | 2002-016566 | 1/2002 | |
| JP | 2002-027431 | 1/2002 | |
| JP | 2002-051326 | 2/2002 | |
| JP | 2002056270 A | 2/2002 | |
| JP | 2002-077869 | 3/2002 | |
| JP | 2002-094471 | 3/2002 | |
| JP | 2002-287632 A | 10/2002 | |
| JP | 2002-290359 A | 10/2002 | |
| JP | 2002-335510 | 11/2002 | |
| JP | 2003-009129 | 1/2003 | |
| JP | 2003-032648 | 1/2003 | |
| WO | WO 0139067 | 5/2001 | ........... G06F 17/60 |

* cited by examiner

*Primary Examiner* — John G Weiss
*Assistant Examiner* — Marilyn G Macasiano
(74) *Attorney, Agent, or Firm* — Lerner, David, Littenberg, Krumholz & Mentlik, LLP

(57) ABSTRACT

An interactive privilege supply system in which a user terminal device, a privilege supply device, and a product supply device are connected via a network, wherein the product supply device generates privilege data in which a privilege is interlocked with time; the user terminal device generates entry data within a predetermined period of time in accordance with the privilege data and with contingency data, which is contained in program data transmitted from the privilege supply device; and the privilege supply device generates result data, which contains validity period information about product privilege purchase, in accordance with the relationship between the contingency data and the entry data.

21 Claims, 46 Drawing Sheets

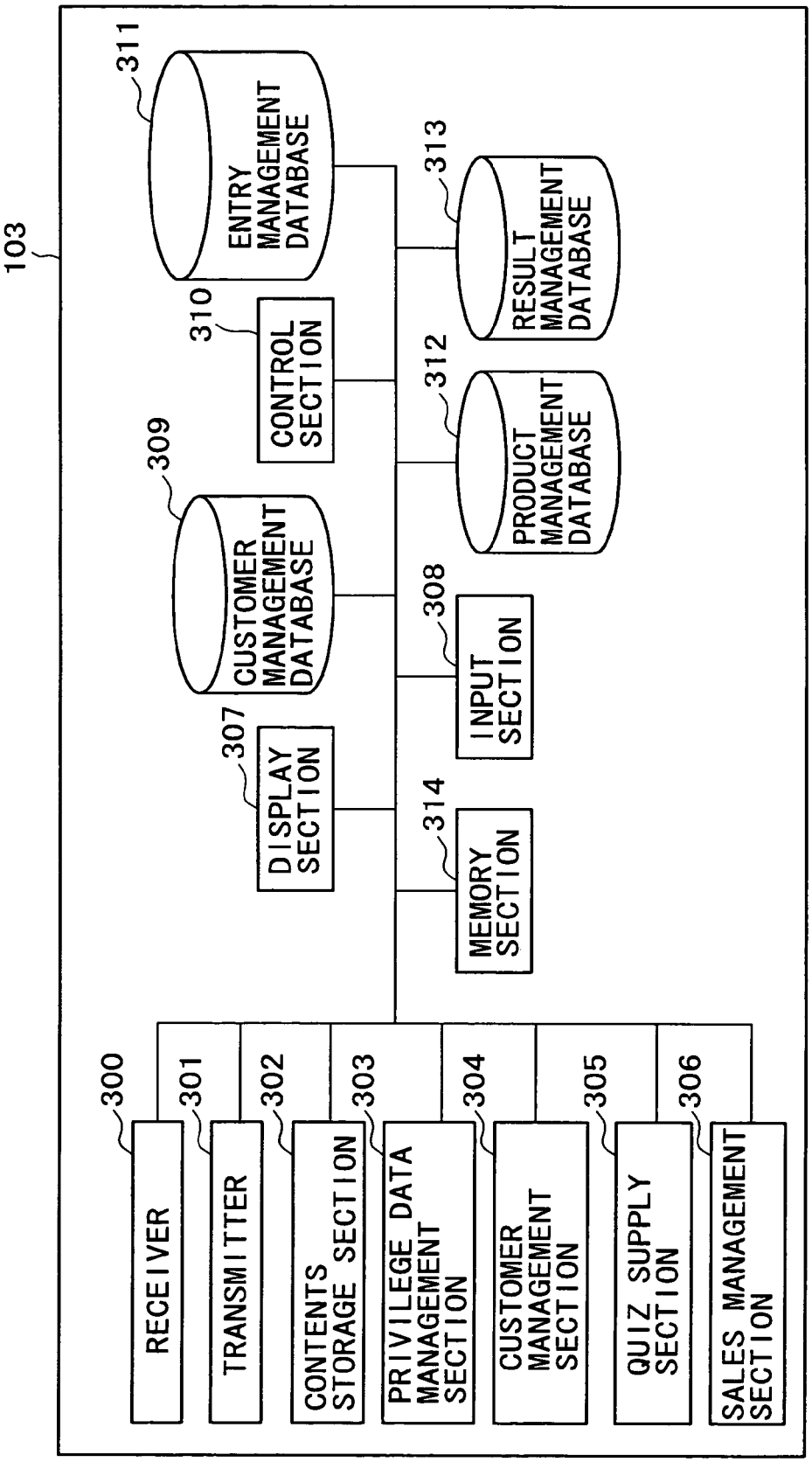

F I G. 5

| | |
|---|---|
| PROFESSIONAL BASEBALL PROGRAM | ～500 |
| START TIME 19:50 | ～501 |
| END TIME 20:59 | ～502 |
| PRODUCT ID:aaa333 MANUFACTURE:mony LINK DESTINATION BEFORE START OF THE PROGRAM 50 POINTS | ～503-1 |
| PRODUCT ID:aaa333 MANUFACTURE:mony LINK DESTINATION 10 MINUTES AFTER START OF THE PROGRAM 40 POINTS | ～503-2 |
| ......... | ......... |
| PRODUCT ID:aaa333 MANUFACTURE:mony LINK DESTINATION END OF THE PROGRAM 2 POINTS | ～503-n |

FIG. 6

```
<service_program name= "baseball" kounyuu_start_time= "19:50:00" kounyuu_end_time= "20:59:00" >
<goods id= "aaa333" goods_maker= "mony" goods_maker_www= "http://www.mony.co.jp/" goods_name= "tv123" >
    <point_pattern>
        <list point= "50" start_time= "20:00:00" end_time= "20:10:00" />
        <list point= "40" start_time= "20:10:00" end_time= "20:20:00" />
        ...
        <list point= "2" start_time= "20:49:00" end_time= "20:59:00" />
    </point_pattern>
</goods>
<goods id= "aaa334" goods_maker= "mony" goods_maker_www= "http://www.mony.co.jp/" goods_name= "tv124" >
    ...
</goods>
</service_program>
```

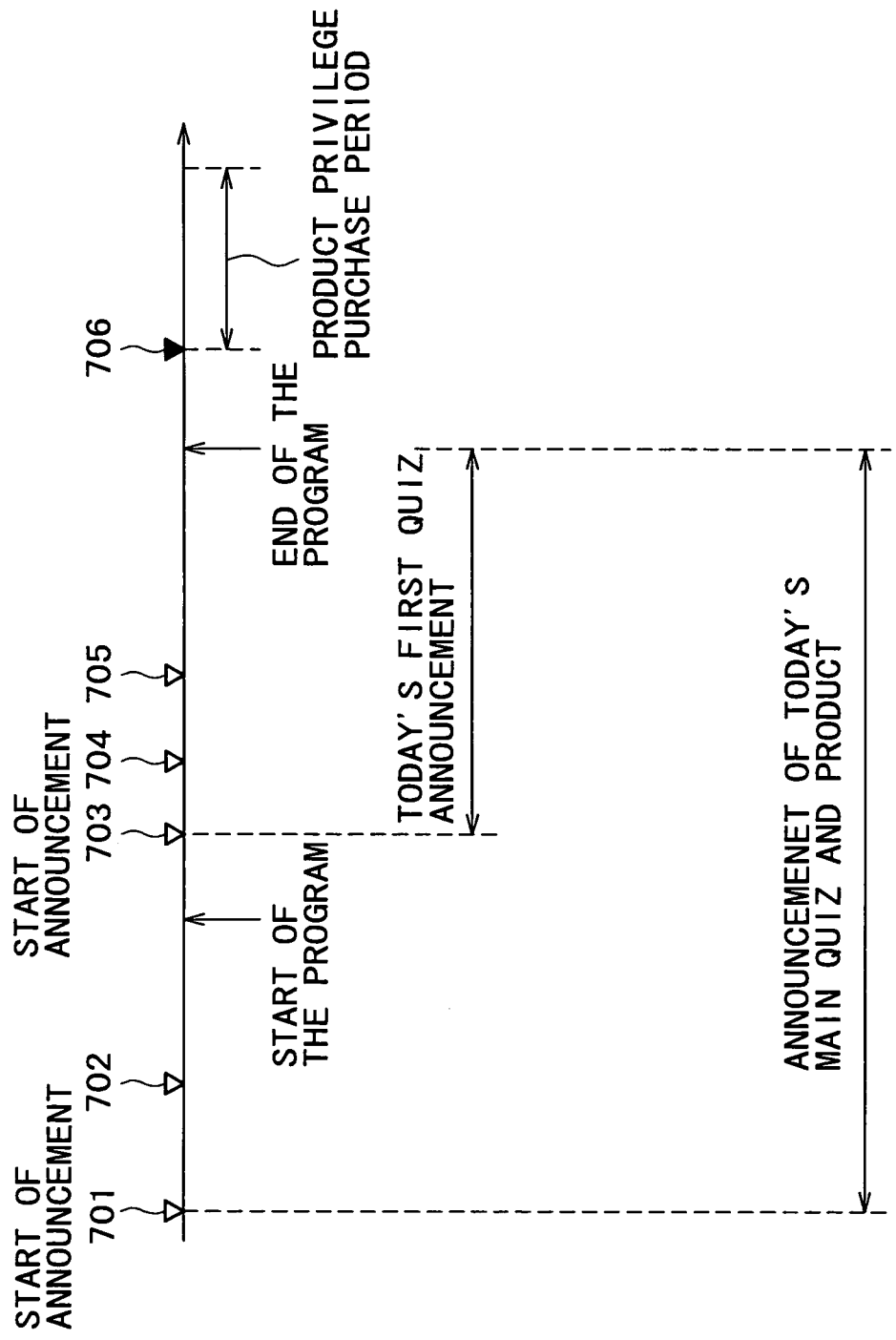

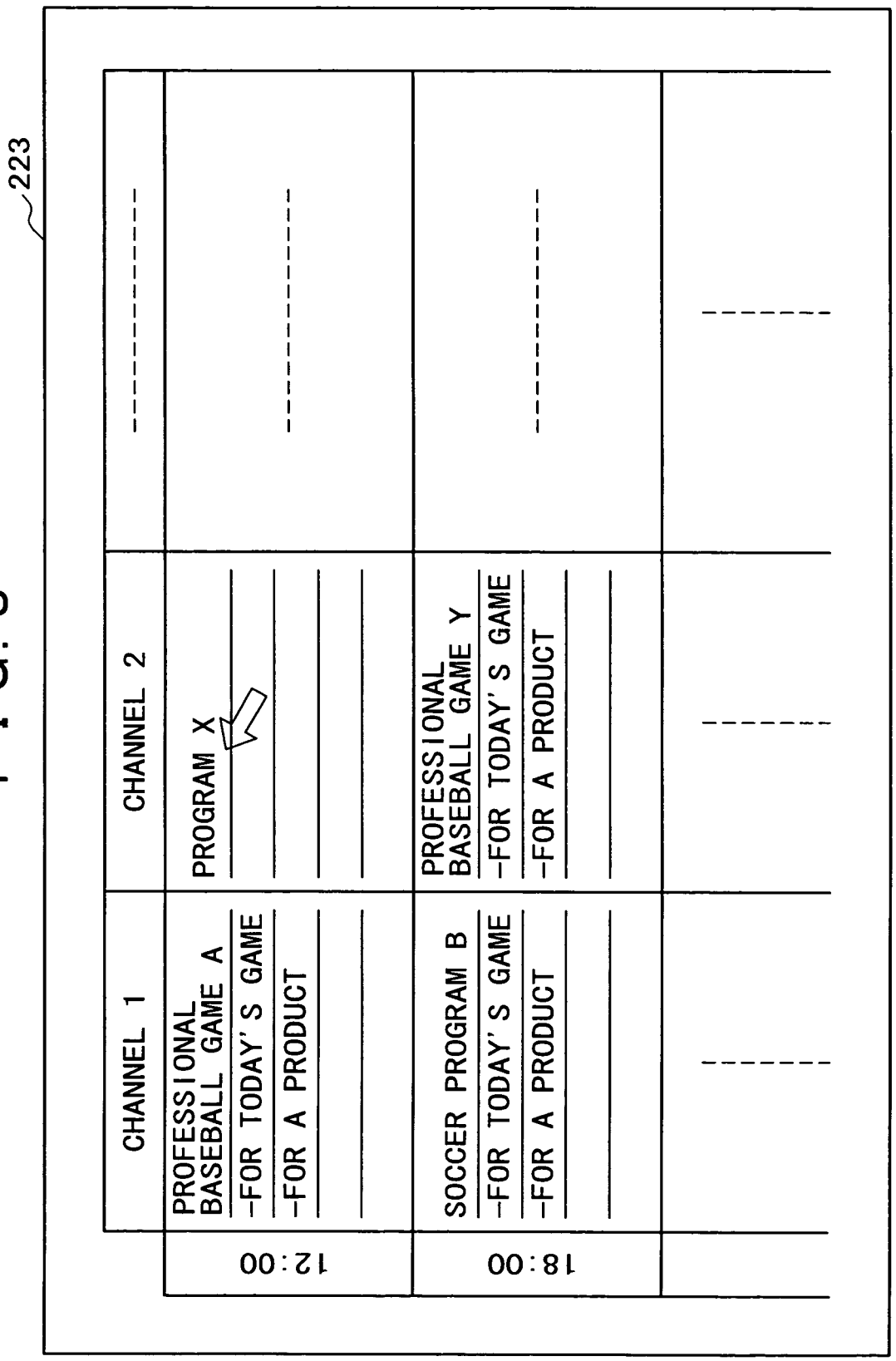

MAIN QUIZ FOR TODAY'S GAME

WHAT WILL BE THE BATTING AVERAGE
OF PLAYER XXX (UNIFORM NUMBER 7)
AT THE END OF TODAY'S BASEBALL GAME?

BACK  ENTRY

FIG. 10

| USER ID | abc12345 |
|---|---|
| NAME | |
| ADDRESS | |
| PHONE NUMBER | |
| ANSWER TO MAIN QUIZ | 345 |

BACK  ENTRY

ENTRY NOW, YOU HAVE A CHANCE TO GET 50 POINTS

- THE FOLLOWING PRODUCTS CAN BE
  PURCHASED AFTER TODAY'S GAME:

① PRODUCT A

② PRODUCT B

③ PRODUCT C

- THE PRODUCTS AVAILABLE AFTER TODAY'S GAME CAN BE SELECTED FROM THE FOLLOWING SITES:

① XXX CAMERA STORE

② ABC DEPARTMENT STORE

③ XXX ELECTRIC APPLIANCE STORE

F I G. 1 3

```
<user user_name= "TARO YAMADA" user_address= "shinagawaku tokyo" tel_number= "03-3333-3333" />
```

FIG. 14

```
<user user_id= "abc12345" user_name= "TARO YAMADA" user_address= "shinagawaku tokyo" tel_number= "03-3333-3333" />
```

| USER ID | aaaaa1 |
| NAME | |
| ADDRESS | |
| PHONE NUMBER | |
| ANSWER TO MAIN QUIZ | 351 |

BACK    ENTRY

ENTRY NOW, YOU HAVE A CHANCE TO GET 20 POINTS

F I G. 1 7

1st QUIZ FOR TODAY'S GAME

HOW MANY RUNS WILL BE SOCORED BY TEAM
L IN THE BOTTOM OF THE SECOND INNING?

BACK    ENTRY

F I G. 1 8

906

| USER ID | |
| NAME | |
| ADDRESS | |
| PHONE NUMBER | |
| ANSWER TO 1st QUIZ | |

BACK    ENTRY

ENTRY NOW, YOU HAVE A CHANCE TO GET 10 POINTS

FIG. 19

```
<user_list point= "50" >
  <user user_id= "abc12345" user_name= "TARO YAMADA" user_address= "shinagawaku tokyo" tel_number= "03-3333-3333" />
  ...
</user_list>
<user_list point= "40" >
  ...
</user_list>
```

RESULTS OF TODAY'S GAME

1st PLACE    ABC    53 POINTS
2nd PLACE    DEF    50 POINTS
3rd PLACE    XYZ    48 POINTS
4th PLACE    CCC    45 POINTS
5th PLACE    TBF    40 POINTS

YOU ARE IN THE 1363rd PLACE WITH 5 POINTS.

F I G. 22

```
<user user_id= "abc12345" goods_id= "aaa333" goods_maker= "mony" goods_name= "tv123" point= "50" />
```

FIG. 23

```
<kounyuu_list>
    <user user_id= "abc12345" user_name= "TARO YAMADA" user_address= "shinagawaku tokyo" tel_number= "03-3333-3333"
    goods_maker= "mony" goods_id= "aaa333" point= "50" time= "20:55:00:099" />
    ...
</kounyuu_list>
```

FIG. 28

```
<user user_id= "AAA" user_name= "TARO YAMADA" user_address= "shinagawaku tokyo" tel_number= "03-3333-3333" limited_time= "2004/2/10:20:00:000" >
  <game_user game_user_id= "XXXX" limited_time= "2003/2/10:20:00:000" flag= "TRUE" ref_googs= "goods1" />
</user>
```
~ 320

FIG. 29

```
<user user_id= "AAA" user_name= "TARO YAMADA" user_address= "Shinagawaku tokyo" tel_number= "03-3333-3333"
<game_user game_user_id= "XXXXX" registration_time= "2003/2/10:20:00:00:000" limited_period= "1/20:00:00:000" limited_time= "2004/2/10:20:00:00:000" >
</user>
```
ref_goods= "goods1" />

```
<user user_id= "AAA" user_name= "TARO YAMADA" user_address= "shinagawaku tokyo" tel_number= "03-3333-3333" limited_time= "2004/2/10:20:00:00:000" >
  <game_user game_user_id= "BBBBB" limited_time= "2002/9/10:20:00:00:000" flag= "FALSE" ref_googs= "goods1" />
  <game_user game_user_id= "CCCCC" limited_time= "2002/10/10:20:00:00:000" flag= "FALSE" ref_googs= "goods1" />
  <game_user game_user_id= "XXXXX" limited_time= "2003/2/10:20:00:00:000" flag= "TRUE" ref_googs= "goods1" />
</user>
```

320

F I G. 3 1
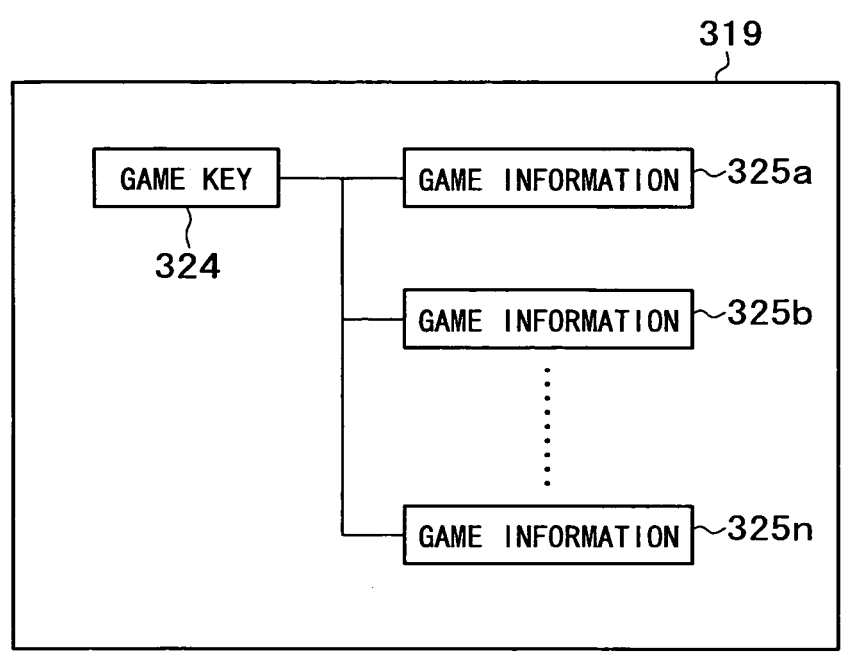

F I G. 32

`<game game_id= "game1" goods_list= "goods1 goods2 goods3 goods4" limited_time= "2003/2/10:20:00:00:000" />`

```
<goods goods_id= "goods1" goods_name= "product 1" maker_name= "Mony" www-address= "http://www.onlinesite.com/" tel_number= "03-3333-3333" ref_game_id= "XXXXX" />
```

327

F I G. 36

```
<user user_name= "TARO YAMADA" user_address= "shinagawaku tokyo" tel_number= "03-3333-3333" />
```

F I G. 37

<user user_id= "AAA" user_name= "TARO YAMADA" user_address= "shinagawaku tokyo" tel_number= "03-3333-3333" limited_time= "2004/2/10:20:00:00:000" />

| USER ID | |
| NAME | |
| ADDRESS | |
| PHONE NUMBER | |
| DESIRED PRODUCT | |

BACK   ENTRY

| GAME USER ID | |
| NAME | |
| ADDRESS | |
| PHONE NUMBER | |
| ANSWER TO MAIN QUIZ | |

( BACK )   ( ENTRY )

| USER ID | [         ] |
| NAME | [         ] |
| ADDRESS | [                    ] |
| PHONE NUMBER | [      ] |
| ANSWER TO MAIN QUIZ | [      ] |

( BACK )  ( ENTRY )

INTERACTIVE PRIVILEGE SUPPLY SYSTEM

BACKGROUND OF THE INVENTION

The present invention relates to an interactive privilege supply system based on a network.

In general, persons selling products advertise their products for sales promotion purposes, for instance, by broadcasting a TV commercial and placing a banner advertisement on a website. Products advertised in this manner may be sold at discounted prices. Such a discount or other similar privilege is given in the same manner to a consumer no matter when or where a product advertisement is viewed or accessed (refer to Patent Document 1).

[Patent Document 1]

Japanese Patent Laid-open No. 2002-56270

No matter whether the above privilege is advertised by the above TV commercial or banner advertisement, the consumers do not have a chance to recognize the TV commercial or banner advertisement if they are not interested in or charmed by a product. As a result, the product cannot become widely known so that the chances of purchasing the product decrease. Therefore, the product supplier or seller cannot make a profit because by acquiring the consumers as their customers although a strategy of offering a privilege is adopted.

Further, no broadcast programs and websites have ever afforded a chance of allowing the consumers during the broadcast of a program to freely participate in an interactively offered service, for instance, for entering a contest to gain a privilege.

SUMMARY OF THE INVENTION

It is an object of the present invention to provide a new, improved interactive privilege supply system that is capable of furnishing a participant in an interactive program with a privilege attached to a product or the like.

To solve the above problems in accordance with a first aspect of the present invention, the present invention provides an interactive privilege supply system in which a user terminal device, a privilege supply device, and a product supply device are connected via a network. The product supply device within the interactive privilege supply system at least generates privilege data in which a privilege is interlocked with time. The user terminal device generates entry data within a predetermined period of time and in accordance with the privilege data and contingency data, which is contained in program data transmitted at least from the privilege supply device. The privilege supply device generates result data, which at least contains validity period information about product privilege purchase, in accordance with the relationship between the contingency data and entry data. The contingency data according to the present invention contains the data about a period before a contingency occurrence, a contingency occurrence, and a period after a contingency occurrence. It corresponds, for instance, to a quiz according to the first to fourth embodiments.

The privilege may be configured so that it is interlocked with the time at which the entry data is generated.

The predetermined period of time may be at least the time interval between the beginning and end of a program.

The contingency data may be such that a plurality of contingency data are generated within the predetermined period of time, and may relate to the program data.

The privilege supply device may be configured so as to manage the entry data in accordance with entry identification information. When such a configuration is employed, the entry data transmitted from the user terminal device can be uniquely identified by the entry identification information to enhance the efficiency of a recording process, in which the entry data is recorded as history information, and a granting process, in which a purchasable privilege is granted to the entry data.

The privilege supply device may be configured so that the entry identification information is set within the result data and transmitted to the product supply device. When such a configuration is employed, the product supply device can send an inquiry about privilege validity to the privilege supply device in accordance with the entry identification information and without having to own a customer information database about a user who belongs to the user terminal device.

User identification information for identifying the user terminal device may be configured so that it is associated with one or more sets of entry identification information. When such a configuration is employed, a plurality of entry identification information sets are associated with the user identification information. It is therefore possible to manage overall entry information based on the entry data with respect to each set of user identification information and make effective use of data.

The entry identification information can be configured so that it is associated with the validity period information. When such a configuration is employed, privilege purchase validity period management for each set of entry identification information can be centrally exercised in accordance with the validity period information. As a result, determination of a privilege purchase can be promptly formulated.

The privilege supply device may be configured so as to conceal the user identification information for identifying the user terminal device from the product supply device. When such a configuration is employed, the personal information based on the user identification information can be integrated into the privilege supply device. As a result, data can be exchanged between the product supply device and user terminal device without having to transmit the user identification information to the product supply device, which is an external device.

To solve the problems in accordance with another aspect of the present invention, the present invention provides a privilege supply device that supplies a privilege, which is furnished by a product supply device, to a user terminal device via a network. The privilege supply device includes generation means for generating result data, which contains at least privilege validity period information, in accordance with the relationship between contingency data, which is contained in the program data to be transmitted to the user terminal device, and entry data, which is to be transmitted from the user terminal device within a predetermined period of time. The generation means according to the present invention corresponds, for instance, to generation means according to the present embodiment.

To solve the problems in accordance with another aspect of the present invention, the present invention provides a computer program that exercises the function of a privilege supply device for supplying a privilege from a product supply device to a user terminal device via a network. The computer program, which exercises the function of the privilege supply device, generates result data, which contains at least validity period information indicating a period during which a privilege is valid, in accordance with the relationship between contingency data, which is contained in program data to be transmitted to the user terminal device, and entry data, which is transmitted from the user terminal device within a predetermined period of time.

In accordance with another aspect of the present invention, the present invention provides a user terminal device to which a privilege from a product supply device is supplied by a privilege supply device via a network. In accordance with product-supply-device-generated privilege data, in which at least a privilege is interlocked with time, and contingency data, which is contained at least in the program data transmitted from the privilege supply device, the user terminal device generates entry data within a predetermined period of time.

In accordance with still another aspect of the present invention, the present invention provides a product supply device for defining the privilege to be supplied to a user terminal device by a privilege supply device via a network. The product supply device generates privilege data in which at least the privilege is interlocked with time.

BRIEF DESCRIPTION OF THE DRAWINGS

FIG. 3 is a schematic block diagram illustrating the configuration of a privilege supply device for an interactive privilege supply system according to the first embodiment.

FIG. 5 is a schematic diagram illustrating the structure of privilege data for an interactive privilege supply system according to the first embodiment.

FIG. 6 schematically illustrates the data structure of privilege data for an interactive privilege supply system according to the first embodiment.

FIG. 7 is a timing chart illustrating the operation of an interactive privilege supply system according to the first embodiment.

FIG. 8 schematically illustrates the structure of an EPG for an interactive privilege supply system according to the first embodiment.

FIG. 9 illustrates the contents of a screen that is displayed on a user terminal device for an interactive privilege supply system according to the first embodiment.

FIG. 10 illustrates the contents of a screen that is displayed on a user terminal device for an interactive privilege supply system according to the first embodiment.

FIG. 11 illustrates the contents of a screen that is displayed on a user terminal device for an interactive privilege supply system according to the first embodiment.

FIG. 12 illustrates the contents of a screen that is displayed on a user terminal device for an interactive privilege supply system according to the first embodiment.

FIG. 13 schematically illustrates the data structure of registration data for an interactive privilege supply system according to the first embodiment.

FIG. 14 schematically illustrates the data structure of customer information data for an interactive privilege supply system according to the first embodiment.

FIG. 15 illustrates the contents of a screen that is displayed on a user terminal device for an interactive privilege supply system according to the first embodiment.

FIG. 16 illustrates the contents of a screen that is displayed on a user terminal device for an interactive privilege supply system according to the first embodiment.

FIG. 17 illustrates the contents of a screen that is displayed on a user terminal device for an interactive privilege supply system according to the first embodiment.

FIG. 18 illustrates the contents of a screen that is displayed on a user terminal device for an interactive privilege supply system according to the first embodiment.

FIG. 19 schematically illustrates the data structure of result data for an interactive privilege supply system according to the first embodiment.

FIG. 20 illustrates the contents of a screen that is displayed on a user terminal device for an interactive privilege supply system according to the first embodiment.

FIG. 22 schematically illustrates the data structure of purchase application data for an interactive privilege supply system according to the first embodiment.

FIG. 23 schematically illustrates the data structure of purchase data for an interactive privilege supply system according to the first embodiment.

FIG. 28 schematically illustrates the data structure of user information according to the second embodiment.

FIG. 29 schematically illustrates the data structure of user information according to the second embodiment.

FIG. 30 schematically illustrates the data structure of user information according to the second embodiment.

FIG. 31 schematically illustrates the structure of a game management database according to the second embodiment.

FIG. 32 schematically illustrates the data structure of game information according to the second embodiment.

FIG. 34 schematically illustrates the data structure of product information according to the second embodiment.

FIG. 36 is a block diagram illustrating the data structure of registration data according to the second embodiment.

FIG. 37 is a block diagram illustrating the data structure of customer information according to the second embodiment.

FIG. 39 illustrates the contents of a screen that is displayed on a user terminal device for an interactive privilege supply system according to the second embodiment.

FIG. 40 illustrates the contents of a screen that is displayed on a user terminal device for an interactive privilege supply system according to the second embodiment.

FIG. 44 illustrates the contents of a screen that is displayed on a user terminal device for an interactive privilege supply system according to the third embodiment.

DETAILED DESCRIPTION OF THE PREFERRED EMBODIMENTS

Figure 1:
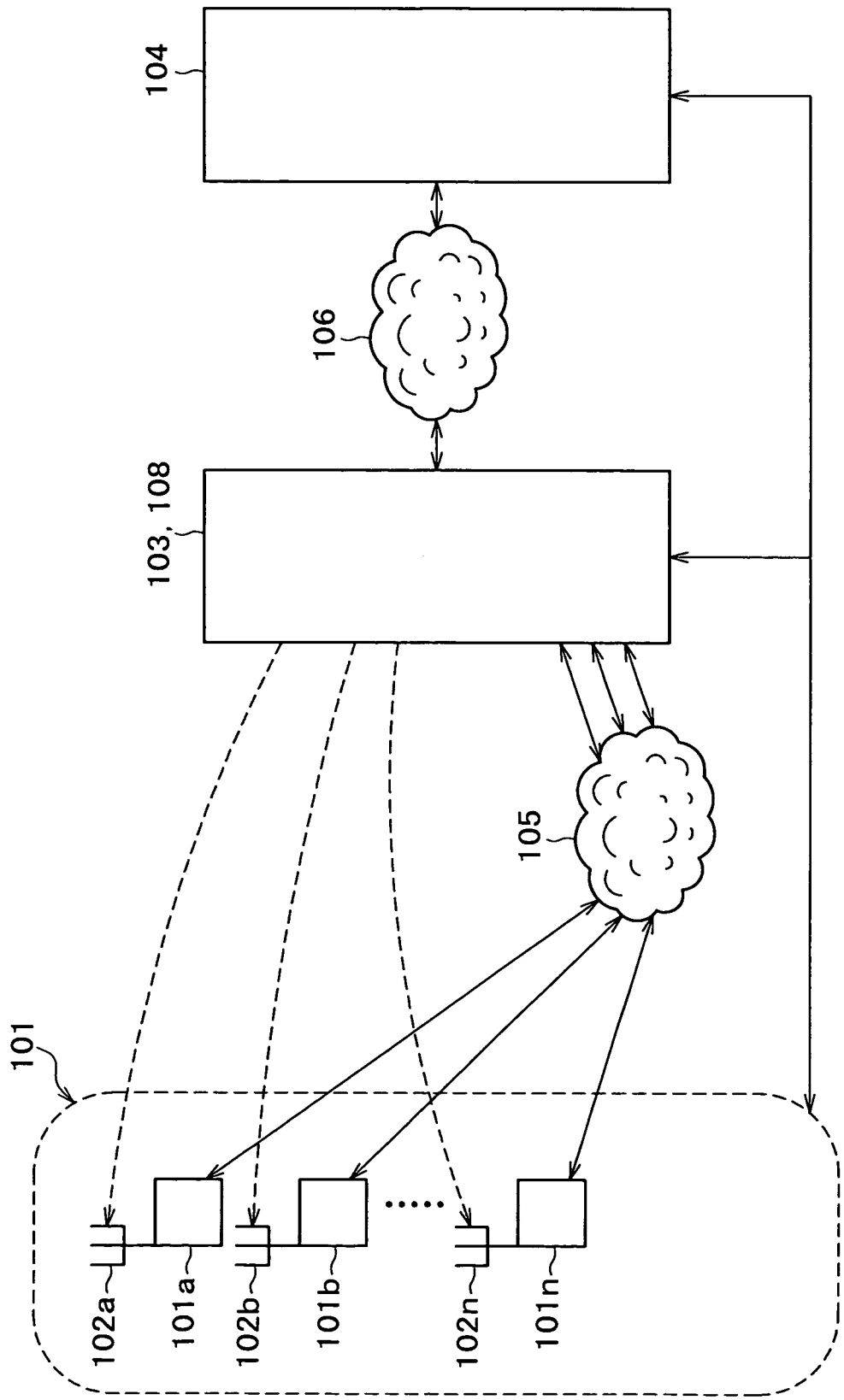
FIG. 1 is a block diagram illustrating the configuration of an interactive privilege supply system according to a first embodiment.

Preferred embodiments of the present invention will now be described in detail with reference to the accompanying drawings. In the following description and accompanying drawings, elements that are substantially equal in functionality and configuration are assigned the same reference numerals to avoid duplicate explanation.

1. Overview of a Business Model According to a First Embodiment

First of all, the concept of a business model of an interactive privilege supply system according to a first embodiment will be described with reference to FIG. 1. FIG. 1 is a block diagram illustrating the configuration of an interactive privilege supply system.

1.1 System Configuration

In an information-based society, user terminal devices 101 (101a, 101b, ..., 101n), a privilege supply device 103, and a product supply device 104 are interconnected via radio wave or a network such as the Internet, as shown in FIG. 1. The user terminal devices 101 are equipped with antennas 102 (102a, 102b, ..., 102n), which, as indicated by broken-line arrows, receive a radio wave transmission from the privilege supply device 103 or mutually exchange data with the privilege supply device 103 via network 105.

The privilege supply device 103 not only transmits a data broadcast, sports broadcast, or other broadcast program to the user terminal devices 101 via radio wave or network 105, but also supplies a game related to a sports broadcast during the period of the sports broadcast. The privilege supply device 103 according to the first embodiment may alternatively be replaced by a plurality of privilege supply devices 103, which may then be used in conjunction with a plurality of channels for program supply.

When, for instance, a baseball program is broadcast, the users belonging to the user terminal devices 101 are allowed to participate in the above game. Baseball-related quizzes are given to the participants. A point is given to the participants answering a quiz correctly so that the participants compete with each other. In addition to the above game, various other items are exemplified, including a quiz for merely giving a point to a participant when answers correctly, a programmed recording rate for a specific program (EPG service), and a questionnaire service for giving a point to a person who answered within a predetermined period of time. After some points are given, for example, the discount rate is determined according to the given points so that a product can be purchased at the determined discount rate. Although the game according to the first embodiment gives points, a discount rate may alternatively be given.

The product supply device 104 is connected to network 106, and responds to the participants in the above game as sponsor. More specifically, the product supply device 104 transmits product data, which indicates a product that can be purchased at a discount (hereinafter referred to as a privilege purchase), or transmits privilege data for privilege granting to the privilege supply device 103. The product supply device 104 according to the first embodiment may alternatively be replaced by a plurality of product supply devices 104.

The privilege supply device 103 belongs to a broadcast station for supplying broadcast programs to the user terminal devices 101 or an ISP (Internet service provider) for supplying multimedia contents to the user terminal devices 101. The product supply device 104 is an information processing device that belongs to a sponsor for the game supplied by the privilege supply device 103.

1.2 Method for Operating the Interactive Privilege Supply System

The participants or users belong to the user terminal devices 101 such as a personal computer or a PDA, cellular phone, PHS, or other mobile gear that can display images. An agency belonging to the product supply device 104 acts as a sponsor and has a job execution system for generating product data with a privilege purchase right or performing a data process for a product handled by the agency or selling the product.

1.2.1 User Registration

For the use of the interactive privilege supply system according to the first embodiment, the users belonging to the user terminal devices 101 are first registered with the privilege supply device 103. When user registration is completed in this manner, user IDs are issued for permitting the users to act as participants. For recognition of the interactive privilege supply system, an advertisement or notice is published via various media.

1.2.2 Game and Product Announcement

The privilege supply device 103 uses an EPG for a data broadcast, a home page, or the like to announce a game and a product that can be purchased by privilege. Upon such announcement, the users can participate in the game from the user terminal devices 101. The term "full entry" applies to the users who participate before starting of a program.

1.2.3 Participating in a Game or Participating after the Beginning of a Program

When a sports program starts, "full entry" is impossible. However, the users still can participate in a game after starting of the program. The game continues during the program. One or more quizzes are given during the program. In the case of halfway-game entry, the number of points that can be scored upon correct answering or the discount rate decreases with time unlike full entry.

1.2.4 Result Display

When the sports program ends, the game also ends. A display section 223 on a user terminal device 101 shows game participants, which are displayed in order from the highest number of acquired points to the smallest. The number of points scored by a participant is displayed on the display section 223 for a user terminal device 101 to which the participant belongs.

The display shows the result whenever a game ends. However, when the game is played multiple times, results of the participants can be displayed in such a manner that the overall ranking is displayed on each user terminal device 101.

1.2.5 Privilege Purchase

By displaying the above results, a user terminal device 101 holding a predetermined rank can purchase an announced product by privilege. However, a period during which the above product can be purchased by privilege is predefined as a validity period. Therefore, if the product is not purchased by privilege within the validity period, the participant belonging to a user terminal device 101 holding the next rank wins the right to purchase the product by privilege.

1.2.6 Purchase Result

The information about a purchase made by a participant belonging to a user terminal device 101 that made a privilege purchase is transmitted to the product supply device 104 via the privilege supply device 103. In accordance with the above purchase information, the product supply device 104 settles an account via a banking institution, and delivers the product to the participant who has made the privilege purchase.

As such being the case, the participants who belong to the user terminal devices 101 and intend to purchase the product by privilege constantly checks the sports program, which gives game quizzes, in order to correctly answer a larger number of quizzes than the other participants. This raises the audience rating of a program supplied by the privilege supply device 103, as well as the recognizability of a sponsor belonging to the product supply device 104, which supplies a product. As a result, the sales channels expand.

2. Configurations of Interactive Privilege Supply System Components

The component configurations of the interactive privilege supply system according to the first embodiment will now be described. The interactive privilege supply system according to the first embodiment may use a Web or a Web and radio wave as a network. However, the following description deals with a case where a Web is used.

2.1 Network 105 and Network 106

Network 105 interconnect the user terminal devices 101 and privilege supply device 103 in such a manner as to establish interactive communication. Network 106 interconnects the privilege supply device 103 and product supply device 104 in such a manner as to establish interactive communication. Typically, networks 105 and 106 are broadband networks that have a broad bandwidth and are capable of rapidly conveying a large amount of data. For example, they may be optical fiber (FTTH), CATV, xDSL, radio communication (FWA), or IMT-2000 networks.

2.2 User Terminal Device 101

Figure 2:
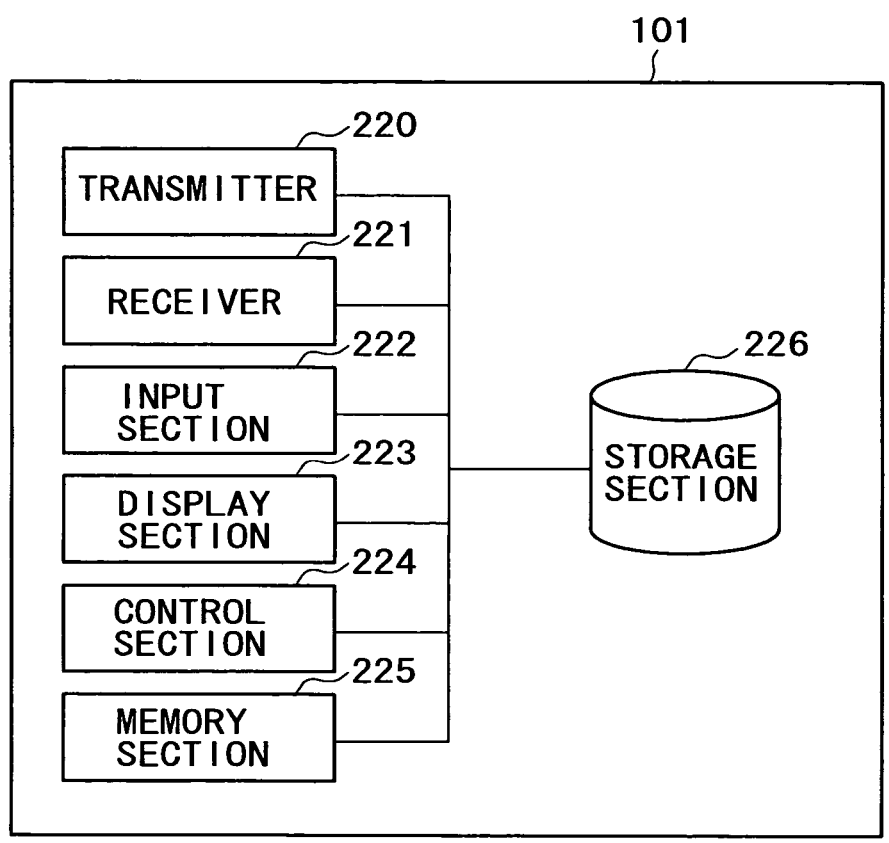
FIG. 2 is a schematic block diagram illustrating the configuration of a user terminal device for an interactive privilege supply system according to the first embodiment.

As shown in FIG. 2, the user terminal device 101 is an information processing device that includes a transmitter 220, a receiver 221, an input section 222 such as a keyboard, a pointing device, or a mouse, a display section 223, a control section 224, a memory section 225, and a storage section 226 such as a hard disk. It is generally a computer.

The transmitter 220 and receiver 221 operate to provide bidirectional data transmission/reception relative to the privilege supply device 103 via the network 105. A WWW browser or other software stored in the storage section 226 displays the result of data transmission/reception on the display section 223.

2.3 Privilege Supply Device 103

The privilege supply device 103 is an information processing device that includes a transmitter 301, a receiver 300, a contents storage section 302 for storing broadcast program data, a privilege data management section 303 for storing and processing privilege data, a customer management section 304, a quiz supply section 305 for generating quiz data for game quiz supply purposes, a sales management section 306 for generating purchase data, on an individual user ID basis, about participants who made a privilege purchase, a display section 307, an input section 308 such as a keyboard, pointing device, or mouse, a control section 310, a memory section 314, a customer management database 309, a product management database 312, a result management database 313, and an entry management database 311. It is generally a computer. The above-mentioned privilege data will be described in detail later.

The contents storage section 302 stores the data about programs to be broadcast via network 105. The program data is either or both of video/audio data, which includes video and audio signals, and data broadcast contents data for a data broadcast.

The customer management database 309 stores customer information data, which includes a user name, address, and phone number or mail address and is entered via the input section 222 of the user terminal device 101. The customer information data contains a user ID, which uniquely identifies a user. It is possible to participate in the game in accordance with such a contained user ID. The customer information data is used as the information for delivering a product that is purchased by privilege.

The product management database 312 stores product data about products that game participants can purchase by privilege. The product data includes, for instance, a product ID, price, and supplier name. The product data is generated for each product supply device 104 that belongs to a sponsor.

The entry management database 311 stores, on an individual user ID basis, the answers to game quizzes that are given during a sports program or other broadcast program. The answers to the quizzes are transmitted from the user terminal device 101 as answer data.

At the end of a program, the result management database 313 stores, for instance, on an individual totaling point basis, result data, which is obtained by processing the answers to the game quizzes that are given during the program and stored in the entry management database 311. The result data is displayed on the display section 223 of the user terminal device 101. In result processing, for example, points are given to correct answers among answer data. It is possible to give points as needed to answer data about incorrect answers.

2.4 Product Supply Device

Figure 4:
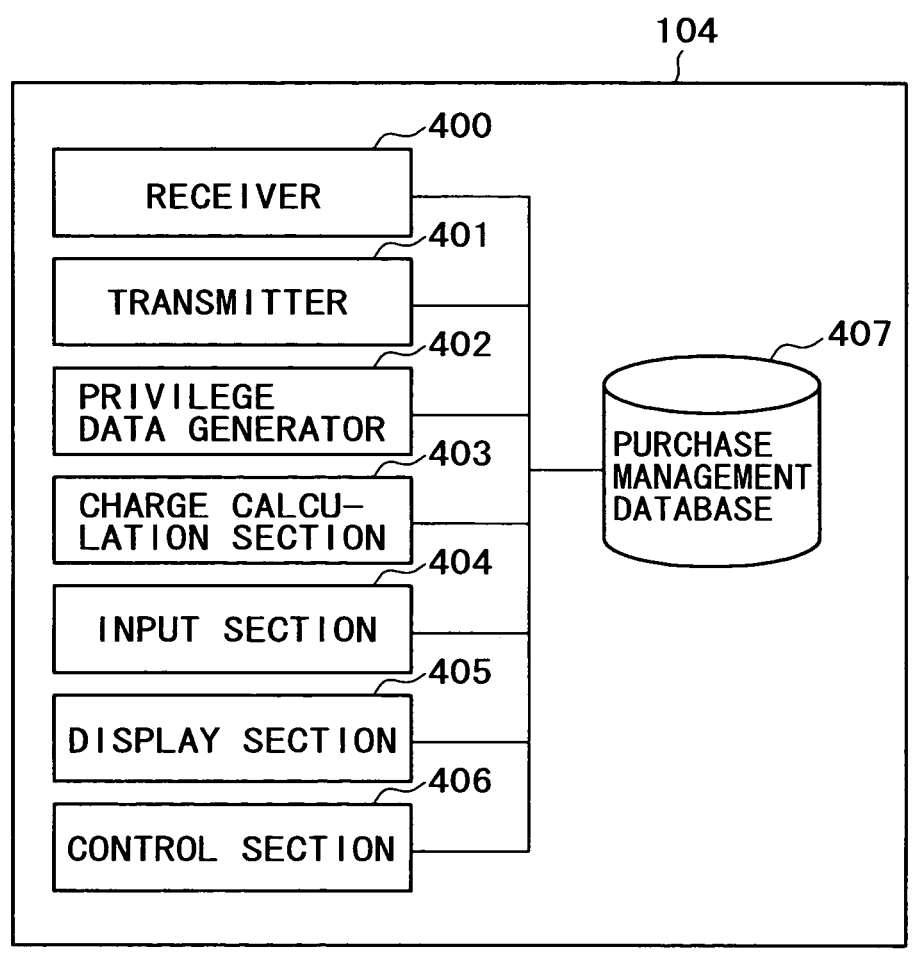
FIG. 4 is a schematic block diagram illustrating the configuration of a product supply device for an interactive privilege supply system according to the first embodiment.

As shown in FIG. 4, the product supply device 104 is an information processing device that includes a transmitter 401, a receiver 400, a privilege data generator 402 for generating privilege data, a charge calculation section 403 for calculating the system charge for the privilege supply device 103 in accordance with the purchase data transmitted from the privilege supply device 103, a display section 405, an input section 404 such as a keyboard, pointing device, or mouse, a control section 406, and a purchase management database 407. It is generally a computer.

The purchase management database 407 stores, on an individual user ID basis, the purchase data about product privilege purchases made by the participants, which is generated by the privilege supply device 103. In accordance with the purchase data, a product is delivered to a participant from the user terminal device 101, which is a purchaser.

In accordance with the purchase data, the charge calculation section 403 calculates the charge as a royalty. The charge is calculated according to a product ID, which is contained in the purchase data, the number of points acquired by a participant, or the discount rate. For example, the calculated charge may constantly be 3% of the total purchase amount of products related to purchase data having less than 15 points of a participant.

3. Interactive Privilege Supply System Operation

An embodiment of the operation of the interactive privilege supply system configured as described above will now be described.

3.1 Process for Supplying Privilege Data from Product Supply Device 104

The process for supplying privilege data from the product supply device 104 will now be described with reference to FIGS. 5 and 6. FIGS. 5 and 6 are schematic diagrams that illustrate privilege data according to the first embodiment.

As described earlier, the privilege supply device 103 must at least receive privilege data from the product supply device 104 beforehand in order to allow the first embodiment of an interactive privilege supply system to let the privilege supply device 103 announce a game and product.

As shown in FIG. 5, the privilege data is structured so that it includes data 500, data 501, data 502 and data 503 (503-1, 503-2, . . . , 503-n).

Data 500 indicates the genre of a program. In the first embodiment, it is a "professional baseball program". Data 501 indicates the time at which the program starts. In the first embodiment, it is "19:50". Data 502 indicates the time at which the program ends. In the first embodiment, it is "20:59".

Data 503 gives privilege descriptions, which coordinate with the time base of program broadcast time. The privilege for each product ID is described. Data 503-1 indicates that the privilege provided for "mony" by the manufacture of product ID "aaa333" is "50 point acquisition as a privilege prevalent before the start of the program". Data 503-2 indicates that the privilege provided for "mony" by the manufacture of product ID "aaa333" is "40 point acquisition as a privilege prevalent for a 10 minute period after start of the program". Subsequently, the number of points acquired as a privilege decreases as the time elapses. Data 503-n, which relates to the end of the program, indicates that the privilege provided for "mony" by the manufacture of product ID "aaa333" is "2 point acquisition as a privilege prevalent at the end of the program". For data 503, the URI of the detailed information about the above product ID is set as a product on-line link destination. Without regard to the above example, an appropriate privilege may be set in accordance with time. Irrespective of the above data structure format, the present invention can be applied to a case where a product price or the like is set when, for instance, the discount rate is to be set instead of the number of points.

The above privilege data is generated by the privilege data generator 402 in the product supply device 104. Upon privilege data generation, the privilege data generator 402 converts the generated data into XML (extensible Markup Language) format and transmits the converted data to the transmitter 401. The transmitter 401 transmits the privilege data to the privilege supply device 103 via network 106.

As indicated in FIG. 6, the privilege data is written in XML format and composed of a plurality of tags. However, the privilege data according to the first embodiment is not limited in XML format. It remains effective even when it is written in BML (Broadcast Markup Language) format, BCML (Broadcast Content Markup Language) format, or other similar format.

As shown in FIG. 6, the tag defined by <service_program name="baseball" kounyuu_start_time="19:50:00" kounyuu_end_time="20:59:00"> indicates that the program to be broadcast (service_program name) is a professional baseball program "baseball", and that the start of purchase (kounyuu_start_time), which is the start of the program is "19:50:00", and further that the end of purchase (kounyuu_end_time), which is the end of the program, is "20:59:00".

3.2 Registration Process by User Terminal Device 101

The registration process performed by a user terminal device 101 according to the first embodiment will now be described.

As described earlier, pre-registration is required for a user terminal device 101 to participate in a game provided by the first embodiment of an interactive privilege supply system. When it is recognized that the user terminal device 101 is registered, a unique identification number (user ID) is assigned to the user terminal device 101. This registration process can be completed not only at the time of pre-registration but also when an entry process is performed for participating in a game. Further, a password can be assigned to each user ID.

Therefore, when the privilege supply device 103 is accessed for pre-registration purposes and at least the name, address, and phone number are entered from a registration screen (not shown), which are displayed on the display section 223 of the user terminal device 101, registration data is generated as shown in FIG. 13.

The registration data shown in FIG. 13 is written with a tag. As indicated in FIG. 13, the tag indicates that the name of a participating user ("user_name") is "TARO YAMADA", and that the address ("user_address") is "Shinagawaku, tokyo", and further that the phone number ("tel_number") is "03-3333-3333". Tags according to the first embodiment are written in XML, BML, BCML, or other similar format.

When the transmitter 220 of the user terminal device 101 transmits the registration data shown in FIG. 13 to the privilege supply device 103, the customer management section 304 assigns an user ID to generate customer information data as indicated in FIG. 14. The customer information data is then stored in the customer management database 309. This concludes the registration process for the user and enables the user to participate in the game.

The customer information data shown in FIG. 14 is generated when the customer management section 304 assigns a user ID to the registration data shown in FIG. 13. Therefore, "abc112345", which is a user ID ("user_id"), is attached to the registration data, which is described above and shown in FIG. 13. Tags according to the first embodiment are written in XML, BML, or BCML, or other similar format.

3.3 Game Entry Process and Halfway-game Entry Process by User Terminal Device 101

The game entry process and halfway-game entry process by a user terminal device 101 will now be described with reference to FIG. 7. FIG. 7 is a timing diagram that schematically illustrates the operation of an interactive privilege supply system according to the first embodiment.

As shown in FIG. 7, the game entry process by the first embodiment of an interactive privilege supply system first performs an announcement process 701, for instance, to announce that a game is provided by a sports or other program and announce a product that can be purchased by privilege through the game. The announcement process 701 is performed until the program ends.

As shown in FIG. 8, the above announcement process is performed, for instance, by displaying information within an EPG (electronic program guide) screen, which is provided by a data broadcast, or on a Web page (not shown) for the privilege supply device 103.

The EPG will now be described with reference to FIG. 8. When the user terminal device 101 receives EPG data, it is displayed on the display section 223. The EPG is a program guide that indicates a broadcast schedule. As shown in FIG. 8, the EPG includes the information about various programs on a plurality of channels, which is sorted by time slot.

For example, when the above announcement process 701 begins as indicated in FIG. 8, "Professional Baseball Program A", which starts at 12:00 on channel 1, is provided with the announcement of a game, which reads "For today's game", and the announcement of a product, which reads "For a product".

When the input section 222 of the user terminal device 101 is manipulated to place a cursor 81 over "For today's game" to select it by clicking or otherwise, a game screen 900 as shown in FIG. 9 is displayed on the display section 223.

The game screen 900, which is shown in FIG. 9, is a screen that presents a main quiz concerning the program named "Professional Baseball Program A", which is going to be broadcast. As indicated in FIG. 9, the main quiz is "What will be the batting average of Player XXX (uniform number 7) at the end of today's baseball game?". However, the contents of the quiz vary from one program to another so that the main quiz may be "Which team will win and what will be the score for today's baseball game?".

If, for instance, an "Entry" button is clicked from the input section 222, an entry screen 901 is displayed on the display section 223 as shown in FIG. 10 to prompt for entry in the game.

As shown in FIG. 10, the entry screen 901 includes input fields for entering a "User ID", "Name", "Address", "Phone number", and "Answer to main quiz". Therefore, if, for instance, the "User ID" of a participant who belongs to the user terminal device 101 and the "Answer to main quiz" are "abc12345" and "345", respectively, the input section 222 is used to enter "abc12345" into the "User ID" input field and "345" into the "Answer to main quiz" input field.

If, for instance, the "Entry" button is clicked after input, an entry process 702 is performed for full entry. If pre-registration is not completed, no user ID is assigned. However, entry can be achieved by entering the "Name", "Address", "Phone number", and "Answer to main quiz".

When the entry process 702 is performed as shown in FIG. 7, the control section 224 generates entry data and causes the transmitter 220 to transmit the generated data to the privilege supply device 103. The entry data includes at least the data entered from the input section 222 as shown in FIG. 10. Further, a privilege of "50" points is set in accordance with a privilege data transmitted from the privilege supply device 103 and then transmitted.

The entry process 702, which is performed as indicated in FIG. 7, is for full entry because it is timed before the start of a program. As shown in FIG. 10, the contents of the privilege are such that the number of points obtained when the "Answer to main quiz" is correct is as large as 50. A privilege of, for instance, 2 points is given to all participants whose answer is incorrect. Since certain points are given to all participants, the users are highly motivated to continuously entry in a game. This raises the audience rating of the program and the visibility of a sponsor's product, thereby enhancing the recognizability of the sponsor.

According to the first embodiment, the correct answer is not only when its value is the same as the value expected by a participant but also when the deviation of the value expected by a participant from the value of the correct answer is within a predetermined range. Points may be given to participants when the deviation of the answers of the participants from the correct answer is within the predetermined range. In this instance, points may be given to such participants in order from the smallest deviation to the largest.

Figure 15:
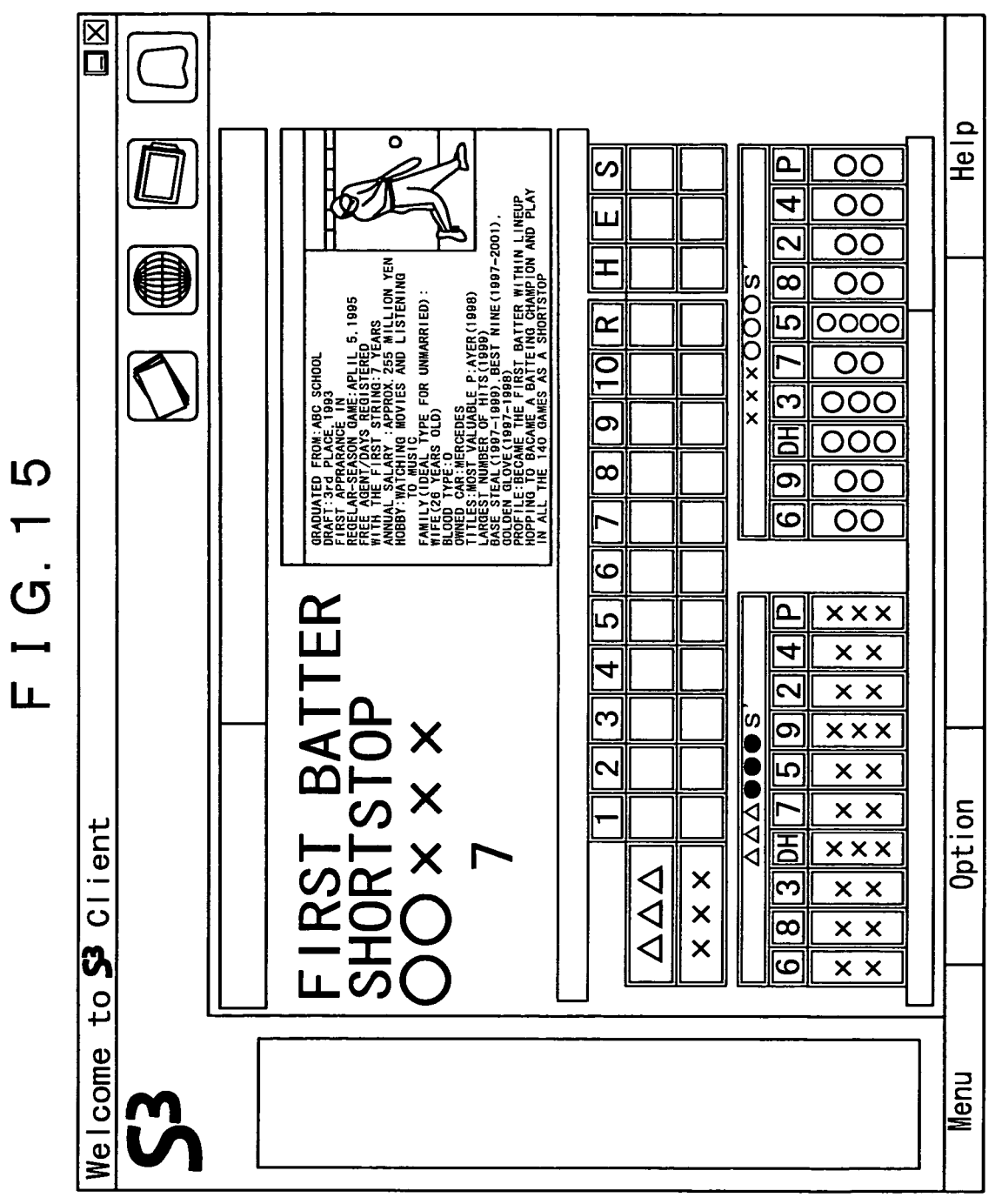

After the start of the program, a detailed information screen concerning a baseball player ("First player, XXX, shortstop") appearing in "Professional Baseball Program A" as shown in FIG. 15 then is displayed on the display section 223 of the user terminal device 101 together with a live baseball game screen for "Professional Baseball Program A", which is broadcast by the privilege supply device 103.

Therefore, it is possible, for instance, to participate in the above-mentioned main game in the top of the fifth inning in accordance with the progress of the baseball game in a live broadcast named "Professional Baseball Program A" and the detailed information shown in FIG. 15. When "For today's game" is clicked or otherwise selected in order to entry the game, for instance, from an EPG or other screen appearing on the display section 223 as shown in FIG. 8, the game screen 900 opens as shown in FIG. 9. When the "Entry" button is selected next, a halfway-game entry screen 904 is displayed on the display section 223 as indicated in FIG. 16.

The first embodiment of an interactive privilege supply system can induce the participants to expect to get points depending on the result of the game. Therefore, the participants are highly motivated to view a program supplied from the privilege supply device 103, correctly answer a game quiz to gain the above privilege, and make a privilege product purchase. As a result, the sales channels expand and the recognizability of a product increases so that the participants can be properly counted as future customers.

Since the acquisition of a privilege depends on the result of the game, the participants enjoy using the interactive privilege supply system. By utilizing the interactive privilege supply system, the participants can be highly motivated to purchase a product.

The halfway-game entry screen 904 will not be described in detail because its contents are basically the same as those of the entry screen 901. However, when, for instance, the "Entry" button is clicked after manipulating the input section 222 to make necessary entries such as "aaaaa1" in the "User ID" field and "351" in the "Answer to main quiz" field, a halfway-game entry process 704 is performed as indicated in FIG. 7.

When the halfway-game entry process 704 is performed as shown in FIG. 7, the control section 224 generates entry data and causes the transmitter 220 to transmit it to the privilege supply device 103. The entry data includes at least the data entered from the input section 222 as shown in FIG. 16. Further, a privilege of "20" points is set in accordance with a privilege data transmitted from the privilege supply device 103 and then transmitted.

The halfway-game entry process 704 shown in FIG. 7 provides halfway-game entry because the program is being broadcast. As indicated in FIG. 16, the contents of the privilege are such that a privilege of 20 points, which represents a smaller number of points than provided by full entry, can be acquired when the "Answer to main quiz" is correct.

Further, at an appropriate timing during a program broadcast, one or more quizzes may be announced in addition to the main quiz. For example, a typical additional quiz that may be given during a baseball program would ask about the number of runs scored in each inning (e.g., 3 runs in the bottom of the second inning). Since the users can participate in a plurality of quizzes in addition to the main quiz, they stand a good chance of winning points. As a result, it is highly probable that the participants view the program from an early inning to the end of the baseball game. In addition, the audience rating of the program can be increased.

When an announcement process 703 is performed as indicated in FIG. 7, the users can participate in a game for the first quiz and an entry screen 905 is displayed on they display section 223. The users can participate in the game until the program ends.

The entry screen 905 shows the 1st quiz, which reads "How many runs will be scored by team L in the bottom of the second inning?", as shown in FIG. 17. The degree of difficulty is rendered lower than that of the main quiz, which is described earlier.

When the "Entry" button is chosen, a first entry screen 906 is displayed on the display section 223 as shown in FIG. 18. As is the case with the entry screen 901, when the "Entry" button is clicked after entering information as needed in the "User ID", "Name", "Address", "Phone number", and "Answer to 1st quiz" input fields, a first entry process 705 is performed as the 1st entry. If pre-registration is not completed, no user ID is assigned. However, entry can be achieved by entering the "Name", "Address", "Phone number", and "Answer to first quiz".

When the first entry process 705 is performed as indicated in FIG. 7, the control section 224 generates first entry data and causes the transmitter 220 to transmit the generated data to the privilege supply device 103. The entry data includes at least the data entered from the input section 222 as shown in FIG. 18. Further, a privilege of "10" points is set in accordance with a privilege data transmitted from the privilege supply device 103 and then transmitted.

Unlike the entry process 702 for the main quiz, the first entry process 705 shown in FIG. 7 gives a relatively easier quiz. Therefore, it provides a privilege of as low as 10 points as shown in FIG. 18 because the above "Answer to 1st quiz" can be made correctly with ease.

Further, when the input section 222 of the user terminal device 101 is manipulated to place the cursor 81 over "For a product" and choose it by clicking or otherwise, as shown in FIG. 8, a game screen 902 as shown in FIG. 11, appears on the display section 223.

As indicated in FIG. 11, the display section 223 shows "(1) Product A", "(2) Product B", and "(3) Product C", which are sold by the sponsor, in addition to the message "The following products can be purchased from today's game:". When any one of "(1) Product A", "(2) Product B", or "(3) Product C" is chosen by clicking or otherwise from the input section 222, the detailed description of the product or the information about the product manufacturer is displayed on the display section 223.

Unlike the case shown in FIG. 11, in which the choice is limited to "(1) Product A", "(2) Product B", and "(3) Product C", a desired product may alternatively be selected from those which are made available by a store, manufacturer, or other sponsor. In this instance, when "(1) XXX camera store", "(2) ABC department store", or "(3) XXX electric appliance store" is selected by clicking or otherwise from the input section 222 as indicated in FIG. 12, a product list is displayed so that a desired product can be picked up from the list. For example, the selectable products may include a gift certificate, travel ticket, product discount, and various other products attractive to the participants. From top to bottom, the displayed product listings, such as product A, product B, and product C, may be arranged in order from the most inexpensive to the most expensive.

3.4 Game Result Process by Privilege Supply Device 103

A game result process performed by the privilege supply device 103 according to the first embodiment will now be described with reference to FIG. 7.

As indicated in FIG. 7, when the program ends, the quiz supply section 305 performs a result process 706 in accordance with entry data that is transmitted as a response from one or more user terminal devices 101 and stored in the entry management database 311.

The quiz supply section 305 stores the data generated by the result process 706 in the result management database 313 as result data. As shown in FIG. 19, the result data is sorted in descending order of the number of points totaled by the result process 706, and written with a tag in XML or other similar format. However, the result data may alternatively be written in BML or BCML format.

As shown in FIG. 19, all participants who won 50 points are written between <user_list point="50"> and </user_list>.

As described earlier, <user user_id="abc12345" user_name="TARO YAMADA" user_address="Shinagawaku, tokyo" tel_number="03-3333-3333"/> is virtually the same as customer information data, which contains a user ID, name, address, and phone number. The subsequent structure is built up similarly in accordance with the number of points.

When the result data is transmitted to the user terminal device 101, a result screen 1000 is displayed on the display section 223 as shown in FIG. 20. Result listings are displayed in order from the biggest scored points to the smallest. A participant can make a privilege purchase of a product at a discount appropriate for the number of scored points if he/she won, for instance, the 5th or higher prize. For example, a participant who won the first prize can make a privilege purchase of a product at a discount of 53%. The first embodiment can be applied not only to a case where participants who won predetermined prizes can make a privilege purchase of a product, but also to a case where all participants who did not won predetermined prizes cam purchase a product at a discount of, for instance, 2% off the list price.

Further, a message such as "You are in the 1363rd place with 5 points" is displayed to indicate the place and the number of scored points of a participant belonging to the user terminal device 101 as shown in FIG. 20. The place and the number of scored points are also displayed if the result data is transmitted to the user terminal device 101 only when requested by the user terminal device 101.

3.5 Privilege Purchase Process by Privilege Supply Device 103

A participant who belongs to a user terminal device 101 and won a predefined prize can purchase a product, for instance, at a predetermined discount rate (can make a privilege purchase). As indicated in FIG. 7, however, the privilege purchase can be made of a desired product only during a privilege purchase period predefined for the product.

Figure 21:
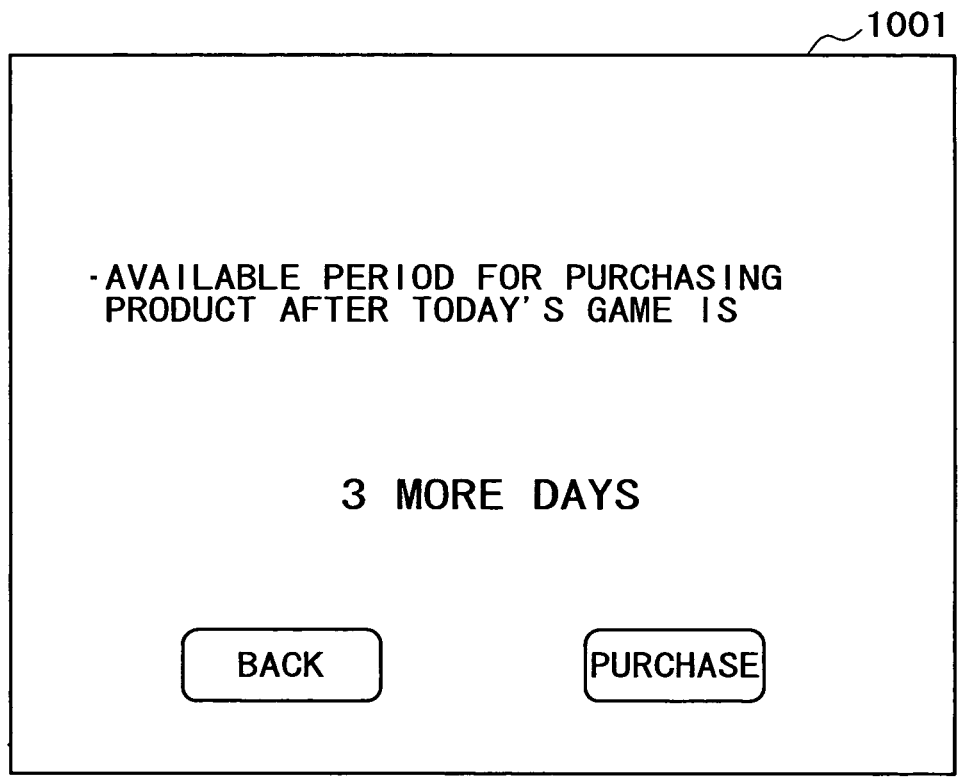
FIG. 21 illustrates the contents of a screen that is displayed on a user terminal device for an interactive privilege supply system according to the first embodiment.

Therefore, when the game ends, a purchase screen 1001 is displayed on the display section 223 of the user terminal device 101 as shown in FIG. 21. The purchase screen 1001 reads "three more days" to indicate the privilege purchase period for the product.

When a "Purchase" button is clicked or otherwise selected from the input section 222 of the user terminal device 101 during the privilege purchase period, purchase application data is generated for product purchase application and transmitted to the privilege supply device 103.

As indicated in FIG. 22, the purchase application data includes a user ID (user_id) of "abc12345", a product ID (goods_id) of "aaa333" for identifying the product to be purchased, a manufacturer (goods_maker) of "mony", a product name (goods_name) of "tv123", and a score (point) of "50" points. Alternatively, a discount rate into which the number of scored points is converted may be set. The purchase application data is written with a tag in XML or other similar format. Alternatively, however, a tag in BML or BCML format may also be used.

When the above purchase application data is transmitted, the sales management section 306 generates purchase data in accordance with the purchase application data transmitted for an individual user ID of a participant, and transmits the generated purchase data to the product supply device 104.

The sales management section 306 attaches the "address" and other relevant information to the above purchase data in accordance with the associated user ID, which is contained in the customer information data stored in the customer management database 309. As indicated in FIG. 23, a list of all the data related to a purchase application is then generated for each product supply device 104.

As shown in FIG. 23, the list contains one or more sets of purchase data. Each purchase data set contains an user ID (user_id) of "abc12345", a name (user_name) of "TARO YAMADA", a phone number (tel_number) of "03-3333-3333", a manufacturer name (goods_maker) of "mony", a product ID (goods_id) of "aaa333" for identifying the product for privilege purchase application, a score of "50" points (point), and a purchase application time (time) of "20:55:00: 00:099". The purchase data is written with a tag in XML format. Alternatively, however, a tag in BML or BCML format may also be used. The purchase data values are not limited by the employed format.

Upon reception of the purchase data, the product supply device 104 stores the purchase data in the purchase management database 407, calculates, for instance, the discount rate for a product price from the points that are scored by a participant and contained in the purchase data, and delivers the specified product to the "address" of the participant. Therefore, the participant who belongs to the user terminal device 101 can make a privilege purchase of the product. The price of the product is separately paid via a banking institution. In accordance with the sales amount of the product that is purchased by privilege, the charge calculation section 403 calculates the charge as a royalty. A series of processing steps is now completed by the first embodiment of an interactive privilege supply system.

Unlike a storage type service that permits product purchase at any time, the first embodiment of an interactive privilege supply system can promote sales by, for instance, limiting the time such that an available period for purchasing a product by privilege is three more days.

Further, an interactive privilege supply system according to the first embodiment differs from a sponsor's commercial message, which is announced over a limited period of time during a normal broadcast program, in that the former enables the sponsor's product to be visually recognized through a game and renders it purchasable. With the first embodiment of an interactive privilege supply system, it is therefore possible to make use of the whole program as a commercial message in coordination with an interactive service.

When, for instance, sports live broadcast program coordinates with a game or other interactive service in real time, an interactive privilege supply system according to the first embodiment permits the audience to participate in real time unlike a prerecorded broadcast program so that the audience rating of a live broadcast program can be increased.

The first embodiment has been described with reference to a case where the user terminal device 101 and privilege supply device 103 are interconnected via network 105. However, the first embodiment can also be applied to a case where the user terminal device 101 and privilege supply device 103 are interconnected via radio wave for use in a data broadcast or the like and network 105. The difference between these two cases will now be described.

As shown in FIG. 1, the privilege supply device 103 transmits the program data about a sports program or the like to an antenna 102 provided for the user terminal device 101 via radio wave. When, for instance, the user participates in a game or files an application for product purchase, mutual data exchange is carried out via network 105.

Figure 24:
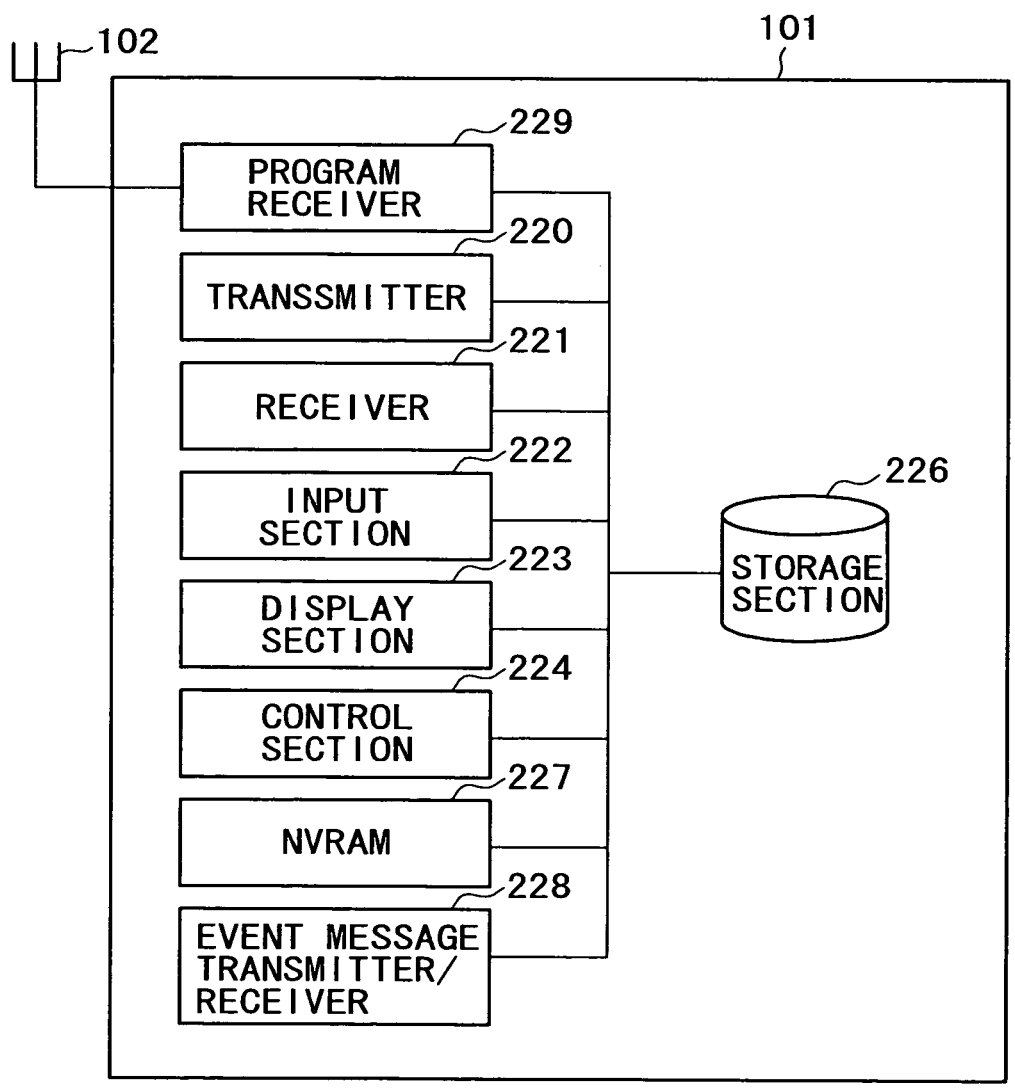
FIG. 24 is a block diagram illustrating a typical modified version of a user terminal device for an interactive privilege supply system according to the first embodiment, which is shown in FIG. 2.

As indicated in FIG. 24, the user terminal device 101 differs from the user terminal device 101 shown in FIG. 2 in that the former includes the antenna 102, a program receiver 229 for particularly receiving the audio and video portions of the program data, an event message transmitter/receiver 228, and an NVRAM 227.

Figure 25:
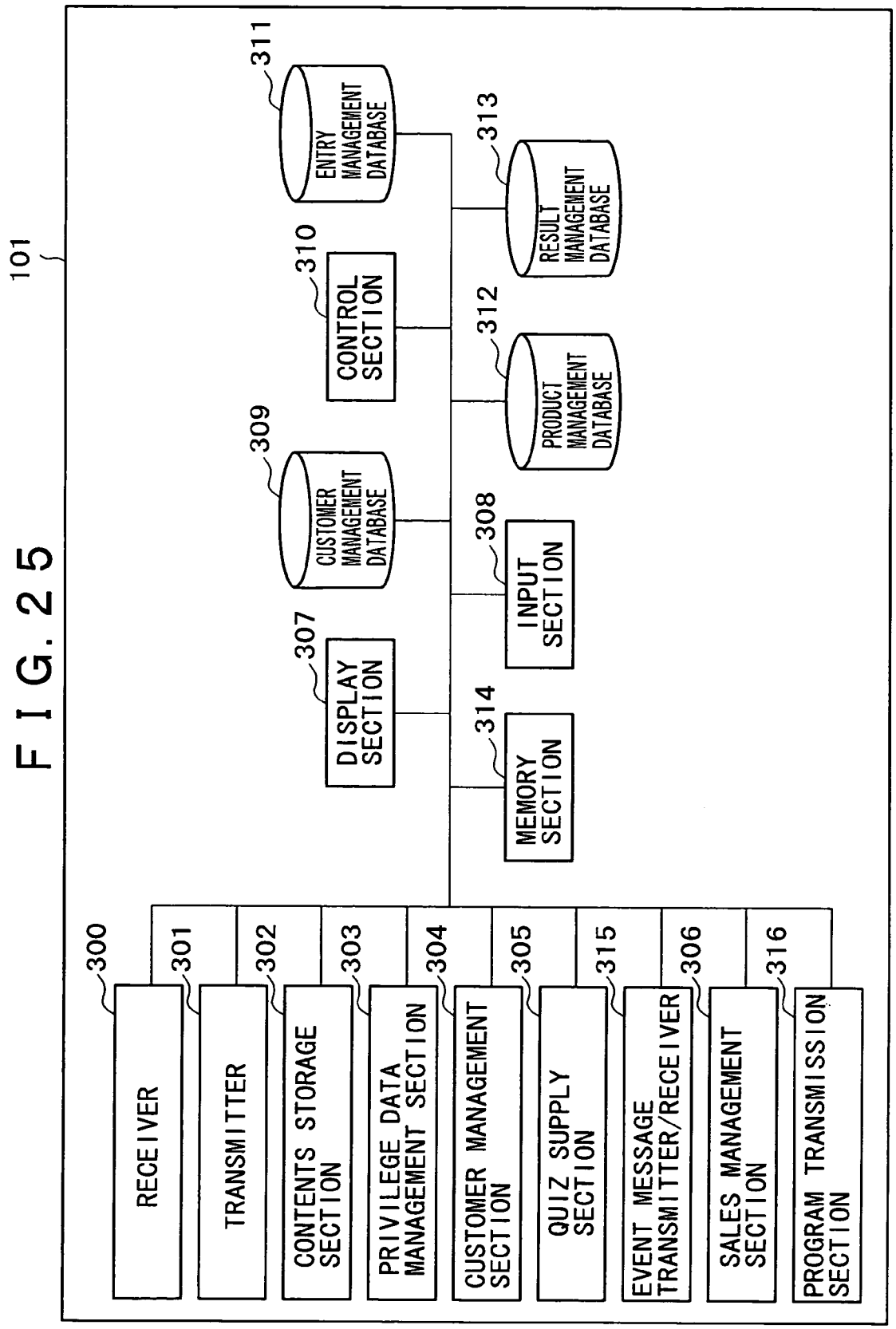
FIG. 25 is a block diagram illustrating a typical modified version of a privilege supply device for an interactive privilege supply system according to the first embodiment shown in FIG. 3.

As indicated in FIG. 25, the privilege supply device 103 differs from the privilege supply device 103 shown in FIG. 3 in that the former additionally includes a program transmission section 316 for transmitting the program data to the antenna 102 and an event message transmitter/receiver 315 for transmitting at least event message data.

When the above event message data is transmitted from the privilege supply device 103 via radio wave, the display section 223 can display, for instance, the entry screen 905 for participating in the 1st quiz during a program broadcast.

4. Overview of Business Model According to Second Embodiment

Next, the concept of a business model of an interactive privilege supply system according to a second embodiment will be described. The following description mainly deals with the differences between the second embodiment of an interactive privilege supply system and the first embodiment of an interactive privilege supply system.

4.1 System Configuration

The interactive privilege supply system according to the second embodiment has virtually the same configuration as the interactive privilege supply system according to the first embodiment. Although the details will not be given, the second embodiment includes user terminal devices 101 (101a, 101b, ..., 101n), a privilege supply device 108, and a product supply device 104, which are interconnected via radio wave or a network such as the Internet.

The privilege supply device 108 according to the second embodiment may alternatively be replaced by a plurality of privilege supply devices 108, which may then be used in conjunction with a plurality of channels for program supply.

4.2 Method for Operating Interactive Privilege Supply System

The method for operating the interactive privilege supply system according to the second embodiment mainly differs from the one for the interactive privilege supply system according to the first embodiment in that the former makes it possible to set a validity period for a user ID and other items of identification information and generates game identification information (game user ID) about a user ID for each entry in a game.

4.2.1 User Registration

The user belonging to a user terminal device 101 is registered with the privilege supply device 108 to assign a user ID to the user. In a user registration process according to the second embodiment, the period during which the system is available can be set at the time of user registration. The user registration process will be described in detail later.

4.2.2 Game and Product Announcement

The privilege supply device 108 uses an EPG for a data broadcast, a home page, or the like to announce a game and a product that can be purchased by privilege through the game.

When a user terminal device 101 participates in the game, a game user ID (game_user_id) is assigned to a user ID, which is registered as described above. Although the above-mentioned game relates to a sports or other similar program, the second embodiment can also be applied to a different type of game.

4.2.3 Participating in a Game

When the game is announced as described above, the detailed information about the game or a product for privilege purchase is supplied. The user terminal device 101 participates in the game in order to answer, for instance, a quiz given during the game and make a privilege purchase of a desired product. For entry, it is necessary that the user terminal device 101 transmit game entry information, which includes a user ID, and that a game user ID be issued to the user ID. The game user ID will be described later. The user can participate in the game until the program providing the game ends. Alternatively, however, the period for game entry may be limited.

4.2.4 Result Display

When the program ends, the game also ends. After the game ends, the privilege supply device 108 performs a result process in accordance with a correct answer to a quiz given during the game and transmits the game result to the user terminal device 101 to report it to a user who has participated in the game and belongs the user terminal device 101. For example, the transmitted game result contains the number of scored points. However, the present embodiment can also be applied to a case where some other items of information are contained in the transmitted game result.

4.2.5 Privilege Purchase

A privilege purchase of the second embodiment mainly differs from the first embodiment in that the game user information managed according to a game user ID is used to check whether or not the valid privilege purchase period has expired. Therefore, if an attempt is made to make a privilege purchase of a product whose valid privilege purchase period has expired, a message is displayed on the user terminal device 101 to indicate that the purchase cannot be made.

4.2.6 Purchase Result

Purchase application data, which is generated when the right to make a privilege purchase is exercised, is transmitted to the product supply device 104. In accordance with the purchase application data, the product purchase price is paid via a banking institution by settling an account with a credit card, electronic money, or other settlement means. The settlement result information is then transmitted to the user terminal device 101 at which the privilege purchase was made. Further, the purchased product is delivered to a participant who made the privilege purchase. In addition, the product supply device 104 transmits royalty payment result information as the result of royalty payment to the privilege supply device 108.

5. Configurations of Interactive Privilege Supply System Components

The component configurations of the interactive privilege supply system according to the second embodiment will now be described. The interactive privilege supply system according to the second embodiment will be described with reference to a case where a Web is used as a network. Components substantially the same as those described in conjunction with the first embodiment of the interactive privilege supply system will not be described again.

5.1 Privilege Supply Device 108

Figure 26:
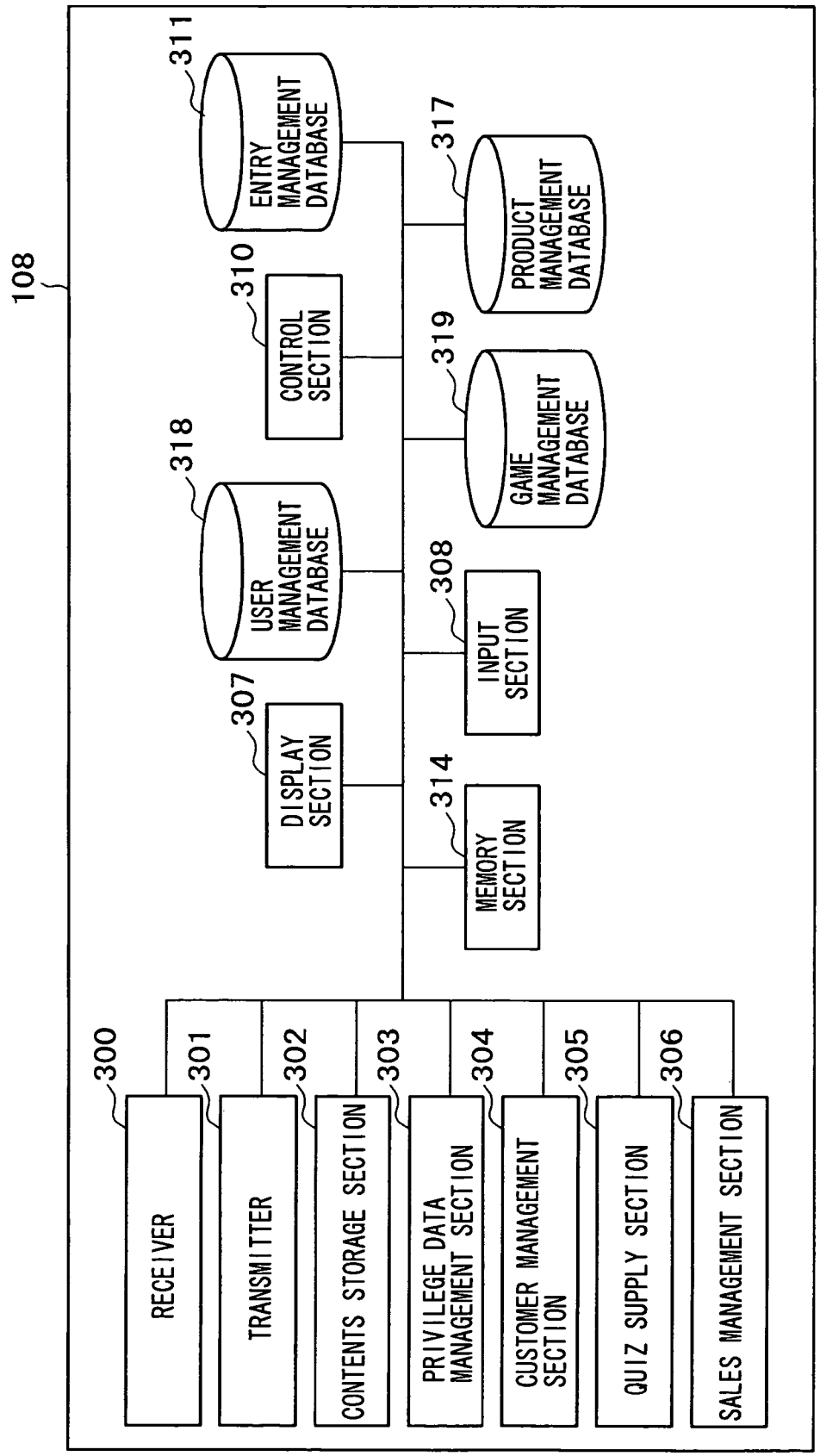
FIG. 26 is a schematic block diagram illustrating the configuration of a privilege supply device according to a second embodiment.

First of all, the privilege supply device 108 according to the second embodiment will be described with reference to FIG. 26. FIG. 26 is a schematic block diagram illustrating the configuration of the privilege supply device according to the second embodiment.

As shown in FIG. 26, the privilege supply device 108 is an information processing device that includes a transmitter 301, a receiver 300, a contents storage section 302 for storing, for instance, the program data to be broadcast, a privilege data management section 303 for storing and processing privilege data, a customer management section 304, a quiz supply section 305 for supplying at least quizzes and performing a result process after quizzes are answered, a sales management section 306, a display section 307, an input section 308 such as a keyboard, pointing device, mouse, or the like, a control section 310, an entry management database 311, a memory section 314, a user management database 318, a game management database 319, and a product management database 317. It is generally a computer.

The privilege supply device 108 according to the second embodiment mainly differs from the privilege supply device 103 according to the first embodiment in that the former has product management database 317 instead of product management database 312 and includes the user management database 318 and game management database 319. The differences between the privilege supply device of the first and second embodiments will now be described.

The user management database 318 stores customer information and game user information, which are generated, for instance, upon user registration and game entry from a user terminal device 101. The customer information is generated upon user registration and assigned at least a user ID. The game user information is generated upon each game entry and assigned at least a game user ID and validity period.

Figure 27:
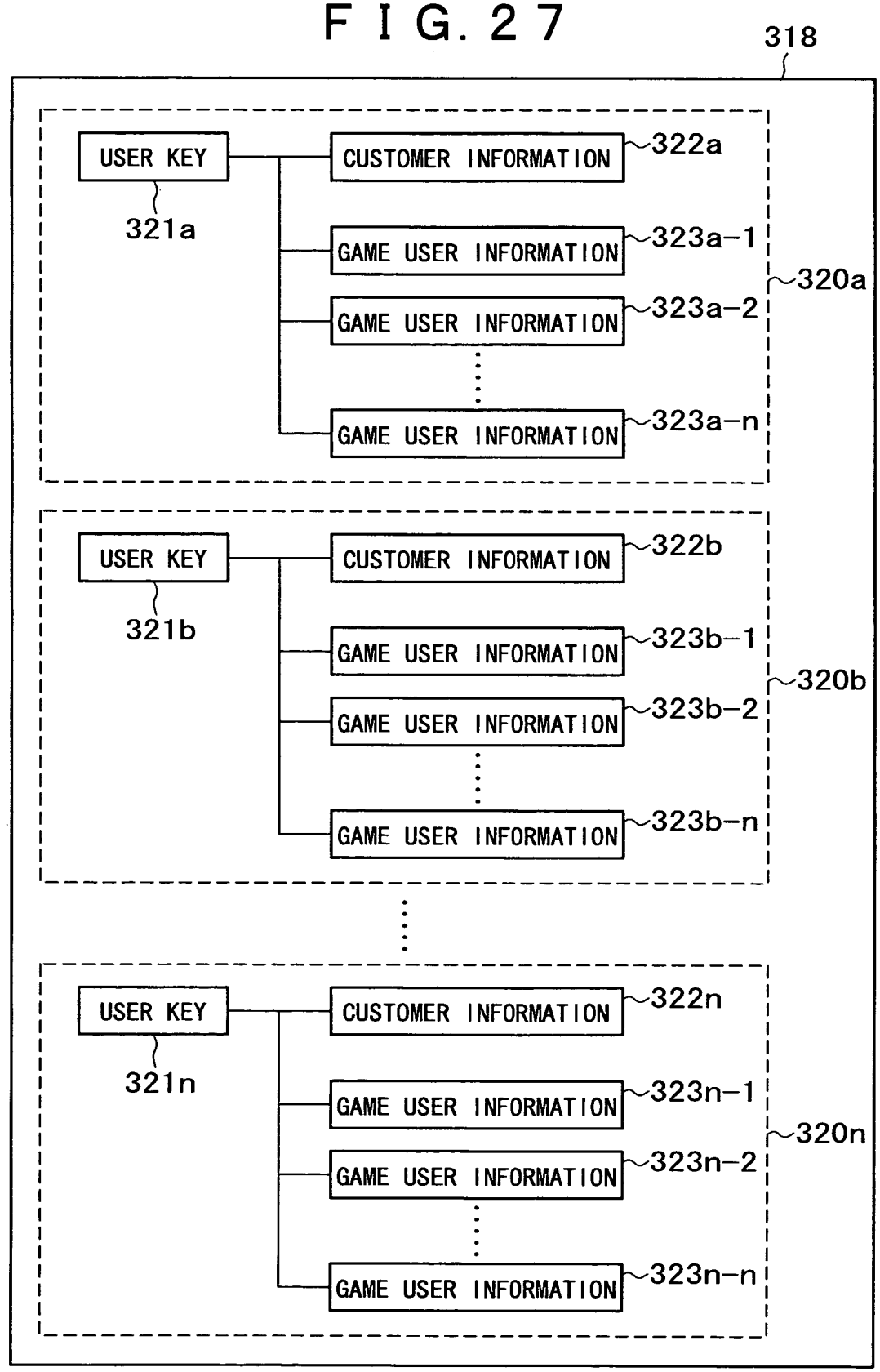
FIG. 27 schematically illustrates the structure of a user management database according to the second embodiment.

The user management database 318 will now be described with reference to FIG. 27. FIG. 27 schematically illustrates the structure of the user management database according to the second embodiment.

As shown in FIG. 27, the user management database 318 stores user information 320 (a, b, . . . , n), which is generated for each user belonging to a user terminal device 101. The user information 320 (a, b, . . . , n) includes at least user keys 321 (a, b, . . . , n) representing main keys, customer information 322 (a, b, . . . , n), and game user information 323 (a-1, a-2, . . . , b-1, b-2, . . . , n-1, n-2, . . . , n-n).

The customer information 322 is used at least to exercise information management over a user ID that is assigned upon user registration, a user name, a user address, a user's phone number, and an expiration date. The expiration date according to the second embodiment, which denotes the period during which the system can be used, may be set by a user terminal device 101. In the second embodiment, a single expiration date may alternatively be stipulated by the privilege supply device 108.

The game user information 323 includes at least a game user ID which is the game identification information assigned to a user ID upon one or more game participations, validity date/time which is set as an absolute validity period of time, registration date/time and registration validity period which are set as a relative validity period of time, a determination flag for indicating whether or not the game user information is valid, a game ID of a target game, and a product ID indicating a product purchased by privilege. The validity date/time, registration date/time, and registration validity period, which are set as validity period values according to the second embodiment, are set upon each game entry. However, the second embodiment can also be applied to a case where the validity period values are not set.

The validity period defined by the game user information 323 is set as an absolute time value or relative time value. However, the second embodiment cannot be applied to a case where both the absolute and relative time values are set within a single set of game user information 323.

The user keys 321 are main keys for uniquely identifying and managing the customer information 322 or game user information 323 in accordance with user IDs. Therefore, it means that the customer information 322 and game user information 323 are mutually linked with user IDs. The following description assumes that the user IDs are used as the user keys 321 according to the second embodiment. However, the second embodiment can also be applied to a case where, for instance, the combinations of a user ID and birth date are used as the user keys.

The data structure of user information 320 according to the second embodiment will now be described with reference to FIG. 28. FIG. 28 schematically illustrates the data structure of user information according to the second embodiment. The user information 320 shown in FIG. 28 is for a case where an absolute time value is used as the validity period setting for the game user information 323.

The user information 320 is generated for each user who belongs to a user terminal device 101 by XML or the like. As shown in FIG. 28, the user information 320 is defined by a tag, which begins with "user". It includes <user . . . > to </user> tags.

The customer information 323 configured as the user information 320 includes <user user_id="AAA" user_name="TARO YAMADA" user_address= "Shinagawaku, tokyo" tel_number="03-3333-3333" limited_time="2004/2/10:20:00:000"/>.

As regards the customer information 322, the user ID is defined by "user_id". The user ID shown in FIG. 28 is "AAA". Further, the user name in the customer information 322 is defined by "user_name". The user name shown in FIG. 28 is "TARO YAMADA".

The user address in the customer information 322 is defined by "user_address". The user address shown in FIG. 28 is "Shinagawaku, tokyo". The user's phone number is defined by "tel_number". The user's phone number shown in FIG. 28 is "03-3333-3333". The system expiration date for the user is defined by "limited_time". FIG. 28 indicates that that the end of the expiration date is "2004/2/10:20:00: 000", which denotes "20:00:00:000, Feb. 10, 2004". Therefore, the privilege supply device 108 exercises period management in accordance with the above limited expiration date.

The game user information 323 includes a tag that begins with "game_user". As shown in FIG. 28, the tag includes <game_user game_user_id="XXXXX" limited-time= "2003/2/10:20:00:00:000" flag="TRUE" ref_goods= "goods1"/>.

As described above, the game user ID within the game user information 323 is defined by "game_user_id". FIG. 28 indicates that the game user ID is "XXXXX". The validity period is defined by "limited_time". FIG. 28 indicates that the end of the validity period is "2003/2/10:20:00:00:000", which denotes "20:00:00:000, Feb. 10, 2003" and is set with an absolute time value. Therefore, the validity period begins when the game user information 323 is generated and ends at "20:00:00:000, Feb. 10, 2003". The absolute time value is a time setting that defines the end of the validity period in seconds.

The determination flag in the game user information 323 is defined by "flag". FIG. 28 indicates that the determination flag is "TRUE" (valid). The determination flag may also be set to "FALSE" (invalid) depending on the situation. The determination flag indicates whether or not the game user information 323 is valid. A desired product is defined by "ref_goods". FIG. 28 indicates that the desired product is "goods1".

The desired product is the product that a user who belongs to a user terminal device 101 wants to make a privilege purchase as a participant at the time of game entry. Therefore, when the game result entitles the user to make a privilege purchase, the user can make a privilege purchase of "goods1". In the example shown in FIG. 28, a product ID is indicated by "goods1". However, the present embodiment can also be applied to a case where a product name or the like is set in the "goods1" position.

The data structure of user information 320 according to the second embodiment will now be described with reference to FIG. 29. FIG. 29 schematically illustrates the data structure of user information according to the second embodiment. The user information 320 indicated in FIG. 29 is for a case where a relative time value is set in the game user information 323 to define the validity period.

As described earlier, the user information 320 is generated by XML or the like for each user belonging to a user terminal device 101. As shown in FIG. 29, the user information 320 is defined by a tag, which begins with "user". It includes <user . . . > to </user> tags.

The customer information 322 configured as the user information 320 shown in FIG. 29 has virtually the same structure as the customer information 322 indicated in FIG. 29. Therefore, it will not be described in detail.

The game user information 323 includes a tag, which begins with "game_user". As shown in FIG. 29, it includes <game_user game_user_id="XXXXX" registration_ time="2003/2/10:20:00:00:000" limited_period=1/20:00: 00:000" flag="TRUE" ref_goods="goods1"/>.

In the game user information 323, the game user ID is defined by "game_user_id". FIG. 28 indicates that the game user ID is "XXXXX".

When the validity period is set with a relative time value, which includes a registration date/time and registration validity period, the registration date/time is defined by "registration_time" as shown in FIG. 29. FIG. 29 indicates that the registration date/time is "2003/2/10:20:00:00:000", which denotes "20:00:00:000, Feb. 10, 2003".

Further, the registration validity period is defined by "limited_period". FIG. 29 indicates that the registration validity period is "1/20:00:00:000", which denotes "1 day and 20 hours".

Therefore, the validity period, which is indicated by a relative time value including the registration date/time and registration validity period, begins at the registration date/ time ("20:00:00:000, Feb. 10, 2003") and ends when the registration validity period ("1 day and 20 hours") elapses. Therefore, when expressed in terms of absolute time, the validity period ends at 16:00:00:000, Feb. 11, 2003.

Since an absolute time value and relative time value cannot simultaneously be set for a single set of game user information, "limited_time" and "registration_time", which are mentioned above, cannot simultaneously be set.

As described earlier, the determination flag within the game user information 323 is defined by "flag". FIG. 29 indicates that the determination flag is "TRUE" (valid). The desired product is defined by "ref_goods" as described earlier. FIG. 29 indicates that the desired product is "goods1".

The data structure of user information 320 according to the second embodiment will now be described with reference to FIG. 30. FIG. 30 schematically illustrates the data structure of user information according to the second embodiment. The user information 320 shown in FIG. 30 is for a case where there are a plurality of sets of game user information 323.

As described earlier, the user information 320 is generated by XML or the like for each user belonging to a user terminal device 101. As shown in FIG. 30, the user information 320 is defined by a tag, which begins with "user". It includes <user . . . > to </user> tags. The customer information 322 configured as the user information 320 shown in FIG. 30 has virtually the same structure as the customer information 322 indicated in FIG. 28. Therefore, it will not be described in detail.

A first set of game user information 323 includes a tag that begins with "game_user". As shown in FIG. 30, it includes <game_user game_user_id="BBBBB" limited_time="2002/9/10:20:00:00:000" flag="FALSE" ref_goods="goods1"/>.

In the first set of game user information 323, the game user ID is defined by "game_user_id". FIG. 30 indicates that the game user ID is "BBBBB".

As indicated in FIG. 30, the validity date/time is defined by "limited_time". FIG. 30 indicates that the validity date/time ends at 20:00:00:000, Sep. 10, 2002".

As described earlier and as indicated in FIG. 30, the determination flag within the first set of game user information is defined by "flag". FIG. 30 indicates that the determination flag is "FALSE" (invalid).

The desired product is defined by "ref_goods" as described earlier. FIG. 30 indicates that the desired product is "goods1".

A second set of game user information 323 includes a tag that begins with "game_user". As shown in FIG. 30, it includes <game_user game_user_id="CCCCC" limited_time="2002/10/10:20:00:00:000" flag="FALSE" ref_goods="goods1"/>. The second set of game user information 323 will not be described in detail because it has virtually the same structure as the first set of game user information 323.

A third set of game user information 323 includes a tag that begins with "game_user". As shown in FIG. 30, it includes <game_user game_user_id="XXXXX" limited_time="2003/2/10:20:00:00:000" flag="TRUE" ref_goods="goods1"/>. The third set of game user information 323 will not be described in detail because it has virtually the same structure as the first set of game user information 323.

When a user ID is used as the main key to set a game user ID in cases where a plurality of sets of game use information 323 are generated as shown in FIG. 30, the game user information 323 can be uniquely specified so that a plurality of sets of game user information 323 can be managed.

Therefore, even when a game is to be held repeatedly or held by another program or otherwise, it is possible to achieve game entry with one user ID as far as a game user ID is assigned.

The game management database 319 stores game information for managing a game that is planned by a sponsor who belongs to the product supply device 104. The game information is generated for each planned game.

Arbitrary information can be set for the user information 320, which includes a user key 321, customer information 322, and game user information 323 according to the second embodiment. Although the present embodiment has been described with reference to a case where an XML tag is used for definition purposes, the present invention can also be applied to a case where some other format is used for definition.

The game management database 319, which is provided for the privilege supply device 108, will now be described with reference to FIG. 31. FIG. 31 schematically illustrates the structure of the game management database according to the second embodiment.

As indicated in FIG. 31, the game management database 319 stores at least a game key 324 and a plurality of sets of game information 325 (a, b, . . . , n). The game information 325 is generated whenever a game is held.

The game information 325 includes a game ID which is assigned each time a game is newly held, a product ID list of privilege products for each game ID, validity date/time indicating the above-mentioned validity period or a combination of a registration date/time and registration validity period. In the product ID list, one or more product IDs are set.

The above validity period is set when a game is planned and registered with the privilege supply device 108. Therefore, the validity period is set within the game user information 323 when a user belonging to a user terminal device 101 participates in a game.

The game key 324 is a main key for uniquely identifying and managing the game information 325 by a game ID. Therefore, it means that a game ID is used to define a link to the game information 325. It is assumed for explanation purposes that the game key 324 according to the second embodiment is a game ID. However, the present invention can also be applied to a case where the game information is uniquely identified in another manner, for instance, by using a combination of a game ID and the date of a game.

The data structure of the game information 325 according to the second embodiment will now be described with reference to FIG. 32. FIG. 32 schematically illustrates the data structure of the game information according to the second embodiment.

The game information 325 is generated by XML or the like for each game to be held (each game ID). As shown in FIG. 32, the game information 325 is defined by a tag that begins with "game" (<game . . . />).

The game information 325 shown in FIG. 32 includes <game game_id="game1" goods_list="goods1 goods2 goods3 goods4" limited_time="2003/2/10:20:00:00:000"/>.

Within the above game information 325, the game ID is defined by "game_id". The game ID shown in FIG. 32 is "game1". The product ID list, which is also within the game information 325, is defined by "goods_list". FIG. 32 indicates that the product ID list is "goods1 goods2 goods3 goods4", which means that privilege product IDs "goods1", "goods2", "goods3", and "goods4" are set.

Within the game information 325, the validity period is defined by "limited_time" as described above. FIG. 32 indicates that the validity period is expressed by "2003/2/10:20:00:00:000", which is a valid date/time indicated by an absolute time value. Therefore, when the game user information 323 is generated, the above valid date/time is referenced and set within the game user information 323.

Although the second embodiment has been described with reference to a case where the valid date/time is set within the game information 325 according to the second embodiment, the present invention can also be applied to a case where the registration date/time and registration validity period are set with relative time values.

Arbitrary information can be set as the game information 325 according to the second embodiment. Further, the second embodiment has been described with reference to a case where the game information 325 according to the second embodiment is defined with an XML tag. However, the present invention can also be applied to a case where the game information 325 is defined in another format.

Figure 33:
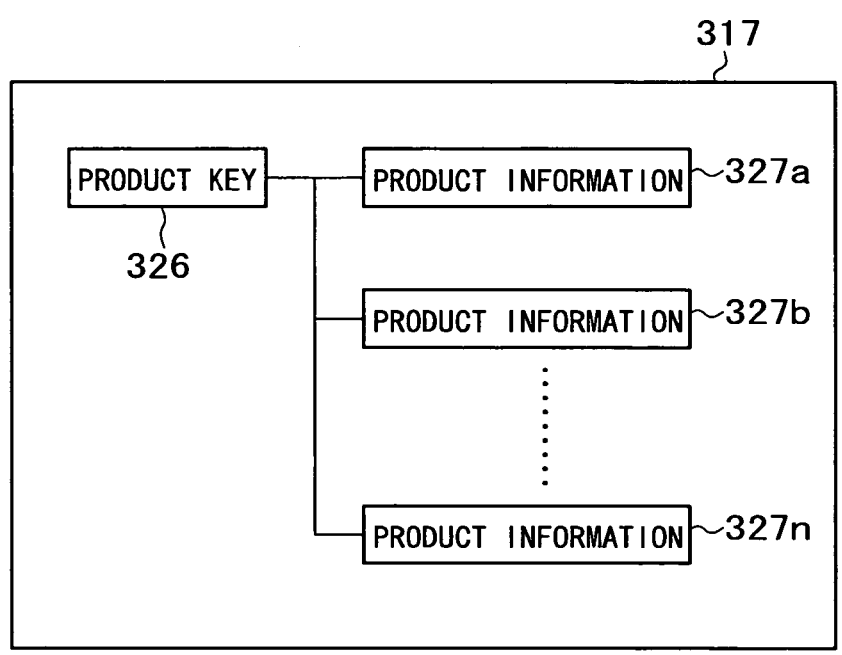
FIG. 33 schematically illustrates the structure of a product management database according to the second embodiment.

The product management database 317, which is provided for the privilege supply device 108, will now be described with reference to FIG. 33. FIG. 33 schematically illustrates the structure of the product management database according to the second embodiment.

As shown in FIG. 33, the product management database 317 stores at least a product key 326, which presents a main key, and a plurality of sets of product information 327 (a, b, ..., n). The product information 327 is generated for each product.

The above product information 327 is set to include a product ID which is assigned whenever a new product is added, a product name of the product, the name of a sponsor who supplies the product, the on-line site address of the sponsor who supplies the product, the phone number of the sponsor who supplies the product, and the game ID of a game in which the product is to be a target as a privilege product. The address may be, for instance, a URL. An appropriate product is selected as a privilege product from one or more sets of product information 327.

The user terminal device 101 can acquire the names of a sponsor, related products, and other detailed information about a privilege product in accordance with the above product information 327 by, for instance, accessing the sponsor's on-line site.

The product key 326 is a main key for uniquely identifying and managing the product information 327 by a product ID. Therefore, it means that a product ID is used to define a link to the product information 327. It is assumed for explanation purposes that the product key 326 according to the second embodiment is a product ID. However, the present invention can also be applied to a case where the product information is identified in another manner, for instance, by using a combination of a product ID and game ID.

The data structure of the product information 327 according to the second embodiment will now be described with reference to FIG. 34. FIG. 34 schematically illustrates the data structure of the product information according to the second embodiment.

The product information 327 is generated by XML or the like for each privilege product (each product ID). As shown in FIG. 34, the product information 327 is defined by a tag that begins with "goods" (<goods . . . />).

The product information 327 shown in FIG. 34 includes <goods goods_id="goods1" goods_name="product 1" maker_name="Mony"-www-address="http://www.online-site.com" tel_number="03-3333-3333" ref_game_id= "XXXXX"/>.

Within the above product information 327, the product ID is defined by "goods_id". The product ID shown in FIG. 34 is "goods1". The sponsor name, which is also within the product information 327, is defined by "maker_name". FIG. 34 indicates that the sponsor name is "Mony".

Within the product information 327, the sponsor address is also defined by "www-address". FIG. 34 indicates that the sponsor address is "http://www.onlinesite.com". Further, the sponsor's phone number is defined by "tel_number". FIG. 34 indicates that the sponsor's phone number is "03-3333-3333". Furthermore, the game ID, which is targeted for a privilege product, is defined by "ref_game_id". FIG. 34 indicates that the game ID is "XXXXX".

Arbitrary information can be set as the product information 327 according to the second embodiment. Further, the second embodiment has been described with reference to a case where the product information 327 according to the second embodiment is defined with an XML tag. However, the present invention can also be applied to a case where the product information 327 is defined in another format.

6. Interactive Privilege Supply System Operation According to Second Embodiment

The operation performed by the interactive privilege supply system that is configured as described above will now be described.

6.1 Process for Supplying Privilege Data from Product Supply Device 104

Figure 35:
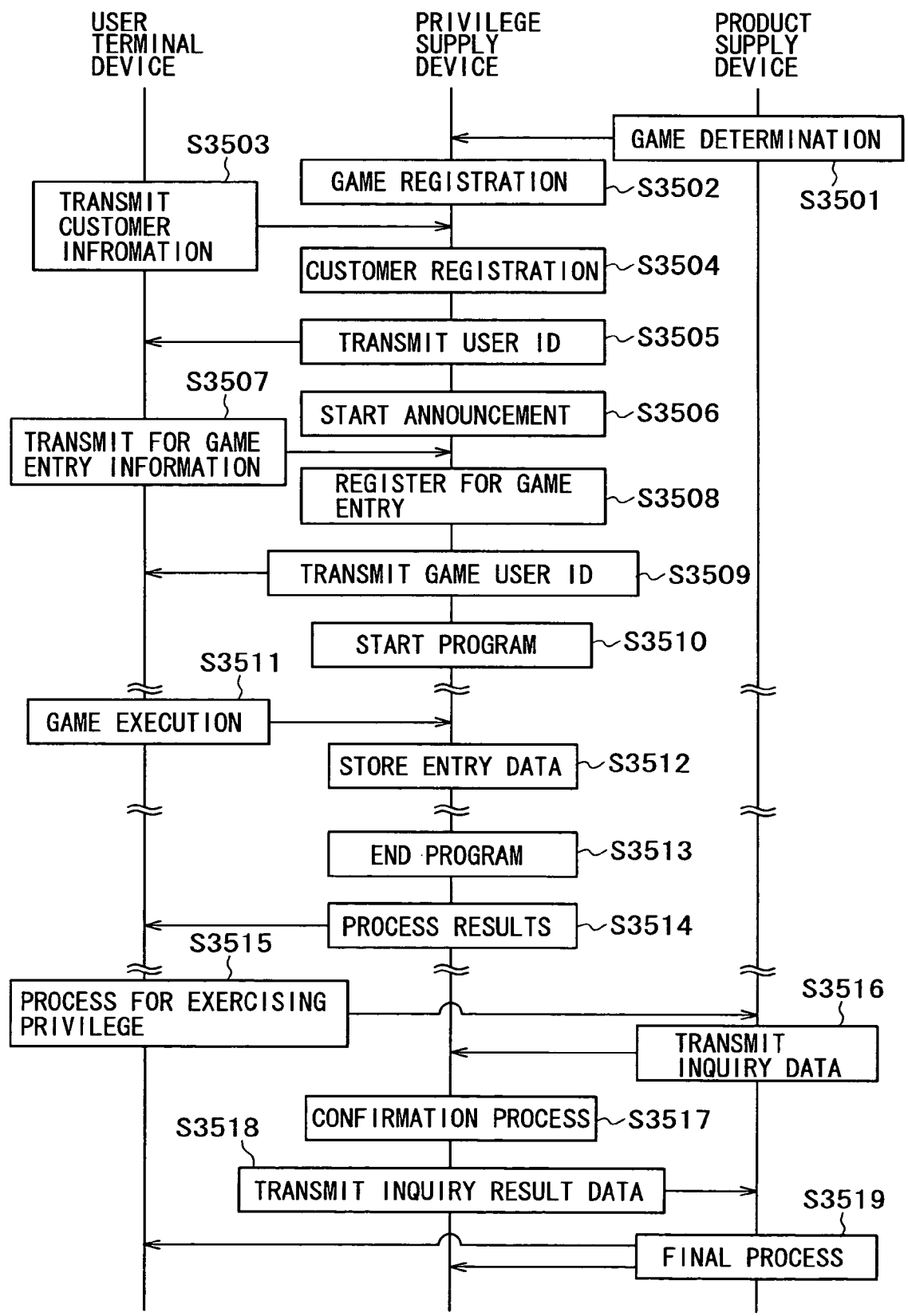
FIG. 35 is a flowchart that schematically illustrates the operation of an interactive privilege supply system according to the second embodiment.

The process for supplying privilege data from the product supply device will now be described with reference to FIG. 35. FIG. 35 is a flowchart that schematically illustrates the operation of the interactive privilege supply system according to the second embodiment.

When the plan for a game is determined as indicated in FIG. 35, the product supply device 104 generates at least game registration data, privilege data, and quiz data for the game, and then transmits them to the privilege supply device 108 (step S3501). The privilege data according to the second embodiment will not be described in detail because it has virtually the same structure as the privilege data according to the first embodiment.

The game registration data includes at least a validity period during which a privilege purchase can be made, a validity period during which game entry is achievable, a product ID of a privilege product, a quiz to be given during a game, and the time at which the quiz is displayed.

The privilege supply device 108 performs a registration process in accordance with the game registration data and privilege data (step S3502). The registration process (step S3502) generates game information 325 in accordance with the game registration data, and assigns a new game ID to the game information 325. The game information 325 is stored in the game management database 319 after game ID assignment.

The privilege data is received and managed by the privilege data management section 303. In accordance with a product ID that is set in the game registration data, a product ID is registered with the game information 325 to define a product that can be purchased by privilege. Further, a game ID is set in the associated product information 327, which is stored in the product management database 317.

6.2 Registration Process by User Terminal Device 101

The registration process performed by a user terminal device 101 according to the second embodiment will now be described.

User registration is required for a user terminal device 101 to participate in a game provided by the second embodiment of an interactive privilege supply system. When such user registration is recognized, unique identification information (user ID) is assigned to the user terminal device 101. This registration process can be completed not only at the time of pre-registration but also when an entry process is performed for participating in a game. Further, a password can be assigned to each user ID during the registration process.

Therefore, when the privilege supply device 108 is accessed, and at least the name, address, and phone number are entered from a registration screen (not shown), which is displayed on the display section 223 for the user terminal device 101, the user terminal device 101 generates registration data as shown in FIG. 36.

The data structure of the registration data shown in FIG. 36 is written with a tag. FIG. 36 indicates that the user name of a participant ("user_name") is "TARO YAMADA", and that the address ("user_address") is "Shinagawaku, tokyo", and further that the phone number ("tel_number") is "03-3333-

3333". Tags according to the second embodiment are written in XML, BML, BCML, or other similar format.

When the transmitter 220 of the user terminal device 101 transmits the above registration data to the privilege supply device 108 (S3053), the customer management section 304 generates customer information 322 shown in FIG. 37 in accordance with the registration data.

As indicated in FIG. 37, the customer management section 304 also assigns a new user ID to the registration data, and generates the customer information 322 to store in the user management database 318 by setting as needed a validity period during which the system can be used. The customer registration process (step S3504) is then terminated.

Upon completion of the customer registration process (step S3504), the privilege supply device 108 transmits the assigned user ID to the user terminal device 101 via network 105 (step S3505). Before being transmitted, the user ID is encrypted. This enables the user terminal device to take part in a game as a participant in accordance with the above user ID.

As shown in FIG. 37, the customer management section 304 writes an absolute time value such as "2004/2/10:20:00: 00:000" to set a validity period within the customer information 322. However, a relative time value may alternatively be used for setup purposes as described earlier.

When the interactive privilege supply system performs a user registration process (step S3502) in accordance with the second embodiment to set a user ID validity period, the user can manage his/her own personal information such as the customer information 322, thereby acquiring a sense of security.

6.3 Game Entry Process by User Terminal Device 101

When the customer registration process (step S3504) ends and a user ID is transmitted to the user terminal device 101 (step S3505), a user belonging to the user terminal device 101 can participate in a game as indicated in FIG. 35.

The game entry process of the interactive privilege supply system according to the second embodiment first begins to announce, for instance, the information on a game provided for a sports or other program and the information on a product that can be purchased by privilege through the game (step S3506). This announcement process continues till the end of the program. Alternatively, however, the announcement process may terminate in another manner.

The above announcement process (step S3506) is performed, as described in conjunction with the first embodiment, to display the announcement on an EPG (electronic program guide) screen, which is provided by a data broadcast and shown in FIG. 8, or on a Web page (not shown) provided by the privilege supply device 108. Although the announcement process that is performed in accordance with the second embodiment will be described, the present invention can also be applied to a case where no announcement process is performed.

Figure 38:
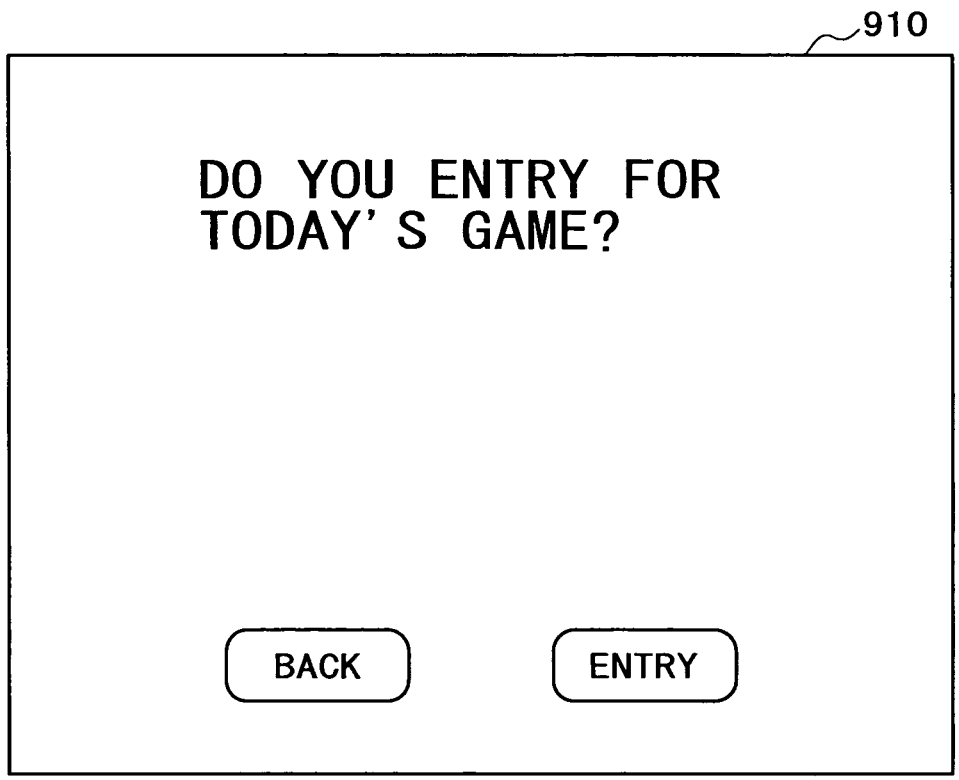
FIG. 38 illustrates the contents of a screen that is displayed on a user terminal device for an interactive privilege supply system according to the second embodiment.

When the announcement process starts (step S3506), game entry is achievable. When a desired game is selected, for instance, from the above-mentioned EPG screen, a game screen 910 shown in FIG. 38 is displayed on the user terminal device 101. As indicated in FIG. 38, "Do you entry for today's game?" is displayed on the game screen 910.

When, for instance, the "Entry" button is clicked from the input section 222, an entry screen 911 is displayed on the display section 223 to prompt for game entry as shown in FIG. 39.

As shown in FIG. 39, the entry screen 911 is provided with input fields for "User ID", "Name", "Address", "Phone number", and "Desired product". Therefore, if, for instance, the "User ID" of a participant belonging to the user terminal device 101 is "AAA", "AAA" is entered in the "User ID" input field. If the desired product is "goods1", "goods1" is entered in the "Desired product" input field.

When the "Entry" button is clicked or otherwise selected after completion of input into the above input fields, the user terminal device 101 generates game entry information in accordance with the information entered in the above input fields and transmits the generated information to the privilege supply device 108 via network 105 (step S3507).

When the game entry information is transmitted to the privilege supply device 108, the customer management section 304 searches the game management database for the associated customer information 322 in accordance with the user ID that is set within the game entry information.

When the customer information 322 in which the user ID is set is obtained, the customer management section 304 generates game user information 323 by setting a validity period for exercising a privilege, a desired privilege product, or the like within the game user information 323 in accordance with the game entry information, and stores the generated information in the user management database 318 in such a manner that it is linked to the associated customer information 322. When the desired privilege product "goods1" is to be set in the game user information 323, the definition "ref_goods="goods1"" is written in the "game_user" tag. However, the present invention can also be applied to a different definition.

When the above game user information 323 is stored in the user management database 318, the customer management section 304 assigns a game user ID to the game user information to conclude a game entry registration process (step S3508). The game user information 323 is generated anew upon each game entry and stored in the user management database 318. Therefore, the game user information 323 can be managed, for instance, as a game entry history of each user.

When the game entry registration process (step S3508) ends, the privilege supply device 108 transmits the game user ID, which is assigned to the user terminal device 101, via network 105 (step S3509). Before the game user ID is transmitted, it may alternatively be encrypted.

The user terminal device 101 receives the game user ID, decrypts it if it is encrypted, and stores it in the storage section 226. Therefore, a participant belonging to the user terminal device 101 uses the transmitted game user ID to participate in a game.

When the program starts (step 3510), a game screen 900 is displayed on the user terminal device 101 as shown in FIG. 9 to display a main quiz for today's game. The game screen 900 opens when the quiz supply section 305 transmits quiz data stored in the memory section 314 via network 105. When a participant answer the main quiz, the "Entry" button is selected by clicking the mouse from the user terminal device 101.

The contents of the game screen 900 according to the first embodiment, which are shown in FIG. 9, are virtually the same as those of the game screen 900 according to the second embodiment. Therefore, the contents of the game screen 900 will not be described in detail.

When the "Entry" button is selected, for instance, by clicking the mouse on it, the entry screen 921 shown in FIG. 40 is displayed on the user terminal device 101. For example, the "Entry" button is selected after making the game user ID, the answer to the main quiz, and other entries in the "Game user ID", "Name", "Address", "Phone number", and "Answer to main quiz" input fields.

Upon "Entry" button selection, the user terminal device 101 generates entry data and transmits it to the privilege supply device 108 via network 105 to execute a game (step S3511). When the game is executed, it is possible that the participant may win the right to purchase a desired product by privilege depending on the result of the game.

Upon reception of the above entry data, the privilege supply device 108 determines according to the game user ID set within the entry data whether or not game entry is possible, and then stores the entry data in the entry management database 311 (step S3512). If the determination result is invalid, a message is transmitted to the user terminal device to indicate that game entry is impossible (not shown). The above determination process will be described later when the description deals with a process for confirming an inquiry data transmission from the product supply device 104 (step S3517).

The above entry data is stored till the end of the game. It is assumed that the game execution process (step S3511) according to the second embodiment is performed after the start of a program. However, the present invention can also be applied to a case where game execution begins, as full entry according to the first embodiment, during the time interval between the instant at which the announcement begins (step S3506) and the instant at which the program starts.

6.4 Game Result Process by Privilege Supply Device 108

The game ends the moment the program ends (step S3513), and the correct answer to the given quiz is determined. The quiz supply section 305 performs a result process on the entry data stored in the entry management database 311 in accordance with the determined correct answer to the quiz (step S3514).

The above result process (step S3514) checks participants' answers within entry data transmitted from one or more user terminal devices 101, which are stored in the entry management database 311, and effects, for instance, initialization (clears data) or resets "invalidity information" in order to invalidate the validity period setting for the game user information 323 about a game user ID for entry data involving an incorrect answer. For a correct answer, no such reset is performed, and the information is stored in the user management database 318 as a validity period for the above privilege purchase.

To announce the reset validity period and other information related to the privilege purchase right, the above result process (step S3514) also transmits a message to user terminal devices 101 that have won the right to make a privilege purchase by answering the quiz correctly. The present invention can also be applied to a case where a message is transmitted to user terminal devices 101 that have not won the right to make a privilege purchase to indicate that the right to make a privilege purchase is not acquired.

The privilege supply device 108 can, for instance, generate list data on an individual user ID basis to enumerate privilege purchases of products by storing the game user information 323 derived from the result process (step S3514) in the user management database 318 as history data.

6.5 Privilege Purchase Process by Privilege Supply Device 108

A participant who belongs to a user terminal device 101 that won the right to make a privilege purchase of a desire product can purchase a product, for instance, at a predetermined discount rate (can make a privilege purchase). However, the privilege purchase can be made of a desired product only during the validity period that was reset in the game user information 323 during the result process (step S3514).

Figure 41:
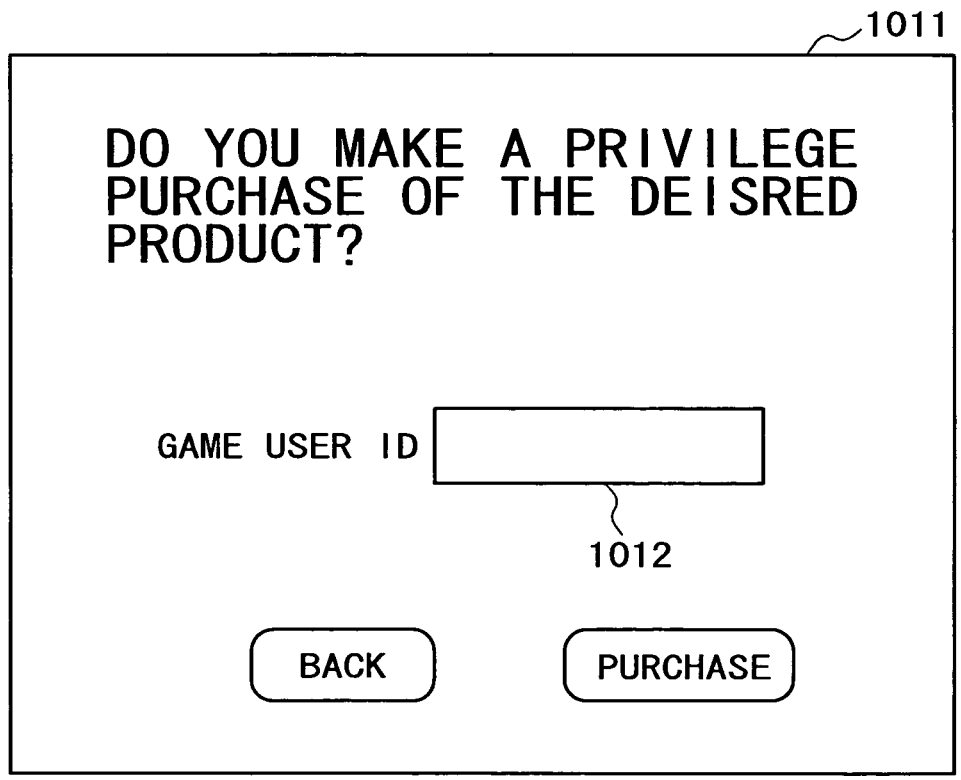
FIG. 41 illustrates the contents of a screen that is displayed on a user terminal device for an interactive privilege supply system according to the second embodiment.

When the user terminal device 101 accesses the product supply device 104 and transmits a desired product ID to the product supply device 104 for making a privilege purchase of the product, a purchase screen 1011 for making a privilege purchase is displayed on the user terminal device 101 as shown in FIG. 41.

When the "Purchase" button is clicked or otherwise selected after a game user ID of the user terminal device 101 is entered in the "Game user ID" input field shown in FIG. 41 from the input section 222 of the user terminal device 101, purchase application data is generated for exercising the right to make a privilege purchase of a product and then transmitted to the product supply device 104 (step S3515).

Upon reception of the above purchase application data, the product supply device 104 generates inquiry data (not shown) for inquiring about the purchase application data and transmits it to the privilege supply device 108. The inquiry data contains at least a game user ID.

In accordance with the above inquiry data, the customer management section 304 of the privilege supply device 108 performs a confirmation process (step S3517). The confirmation process uses the game user ID contained in the inquiry data as a key to search the user management database 318 for the game user information 323.

When the game user information 323 is retrieved as a result of the above search, the customer management section 304 calculates the validity period, which can be derived from an absolute time or relative time value set in the game user information 323, and determines whether or not a privilege purchase can be made.

The determination process according to the second embodiment will now be described. If, for instance, the validity period is indicated by an absolute time value, it is "20:00:00:000, Feb. 10, 2003" as shown in FIG. 28. If the privilege supply device 108 receives the above inquiry data after expiry of the validity period, the game user information 323 is considered to be invalid so that "FALSE" is set for "flag". If, on the other hand, the inquiry data is received before expiry of the validity period, the game user information 323 is considered to be valid so that "TRUE" is set for "flag".

When the determination result indicates that the game user information 323 is valid, the customer management section 3518 generates inquiry result data, which includes the user's name, address, phone number, and other information set as the customer information 322 concerning the game user ID, and transmits the generated data to the product supply device 104 via network 105 (step S3518).

If, on the other hand, the determination result indicates that the game user information 323 is invalid, the customer management section 3518 generates invalid inquiry result data, which does not include the above customer information 322, and transmits the generated data to the product supply device 104 via network 105 (step S3518).

Upon reception of the above inquiry result data, the product supply device 104 checks whether or not the customer information 322 is contained. If the customer information 322 is contained, the product supply device 104 concludes that a valid right is to be exercised, and then performs a final process for validating the exercise of the right (step S3519).

If, on the other hand, the customer information 322 is not contained, the product supply device 104 concludes that an invalid right is to be exercised, and then performs a final process for invalidating the exercise of the right (step S3519) by transmitting message data to the user terminal device 101 to indicate that the right to make a privilege purchase of a product cannot be exercised because it is invalid.

In accordance with the above customer information 322 transmitted from the privilege supply device 108, the product supply device 104 constructs and manages the customer information database (not shown). This makes it possible, for instance, to make good use of the customer information as the information for a close market.

Further, the user ID assigned to a user belonging to the user terminal device 101 is not transmitted to the product supply device 104. Instead, a game user ID is exchanged between the user terminal device 101 and product supply device 104 to conceal the user ID, which closely relates to personal information. In this manner, the possibility of personal information leakage to the outside can be reduced.

The above final process for validating the exercise of the right (step S3519) generates delivery data containing the name, address, and other information about the user in order to deliver a specified product, and generates settlement data by calculating the product price at a predetermined discount rate.

The product supply device 104 transmits the above settlement data to a banking institution managing the user's personal account or a credit card company having a contract with the user. Settlement result data, which is generated upon settlement, is transmitted to the user terminal device 101 (step S3519).

In accordance with the sale of a product purchased by privilege, the charge calculation section 403, which is contained in the product supply device 104, calculates the charge as a royalty, generates royalty payment data, and transmits the generated data to the privilege supply device 108. The royalty is separately paid into an account of a banking institution for the privilege supply device 108. A series of processing steps is now completed by the second embodiment of an interactive privilege supply system.

The second embodiment of an interactive privilege supply system has been described with reference to a case where only the main quiz is given. However, the present invention can also be applied to a case where pluralities of quizzes are given.

The second embodiment of an interactive privilege supply system has been described with reference to a case where a game is held only once. However, the present invention can also be applied to a case where a game is held multiple times on a periodic basis. The present invention is applicable to a case where a game is held multiple times on a plurality of channels on the same day. Therefore, the right to make a privilege purchase of a product can be newly granted in accordance with the cumulative record of a user belonging to the user terminal device 101, which can be derived from the results of a plurality of games.

Unlike a storage type service that permits product purchase at any time, an interactive privilege supply system of the second embodiment can promote sales by, for instance, limiting the privilege purchase period for a product to three days.

Further, an interactive privilege supply system of the second embodiment differs from a sponsor's commercial message, which is announced over a limited period of time during a normal broadcast program, in that the former, for example, enables the sponsor's product to be visually recognized through a game and renders it purchasable. With the second embodiment of an interactive privilege supply system, it is therefore possible to make use of the whole program as a commercial message in coordination with an interactive service.

When, for instance, sports or other live broadcast program coordinates with a game or other interactive service in real time, the second embodiment of an interactive privilege supply system permits the audience to participate in real time unlike a prerecorded broadcast program so that the audience rating of a live broadcast program can be increased.

The second embodiment of an interactive privilege supply system has been described with reference to a case where the user terminal device 101 and privilege supply device 108 are interconnected via network 105. However, the present invention can also be applied, for instance, to a case where the user terminal device 101 and privilege supply device 108 are interconnected via radio wave for use in a data broadcast and network 105. The difference between these two cases will now be described.

Figure 42:
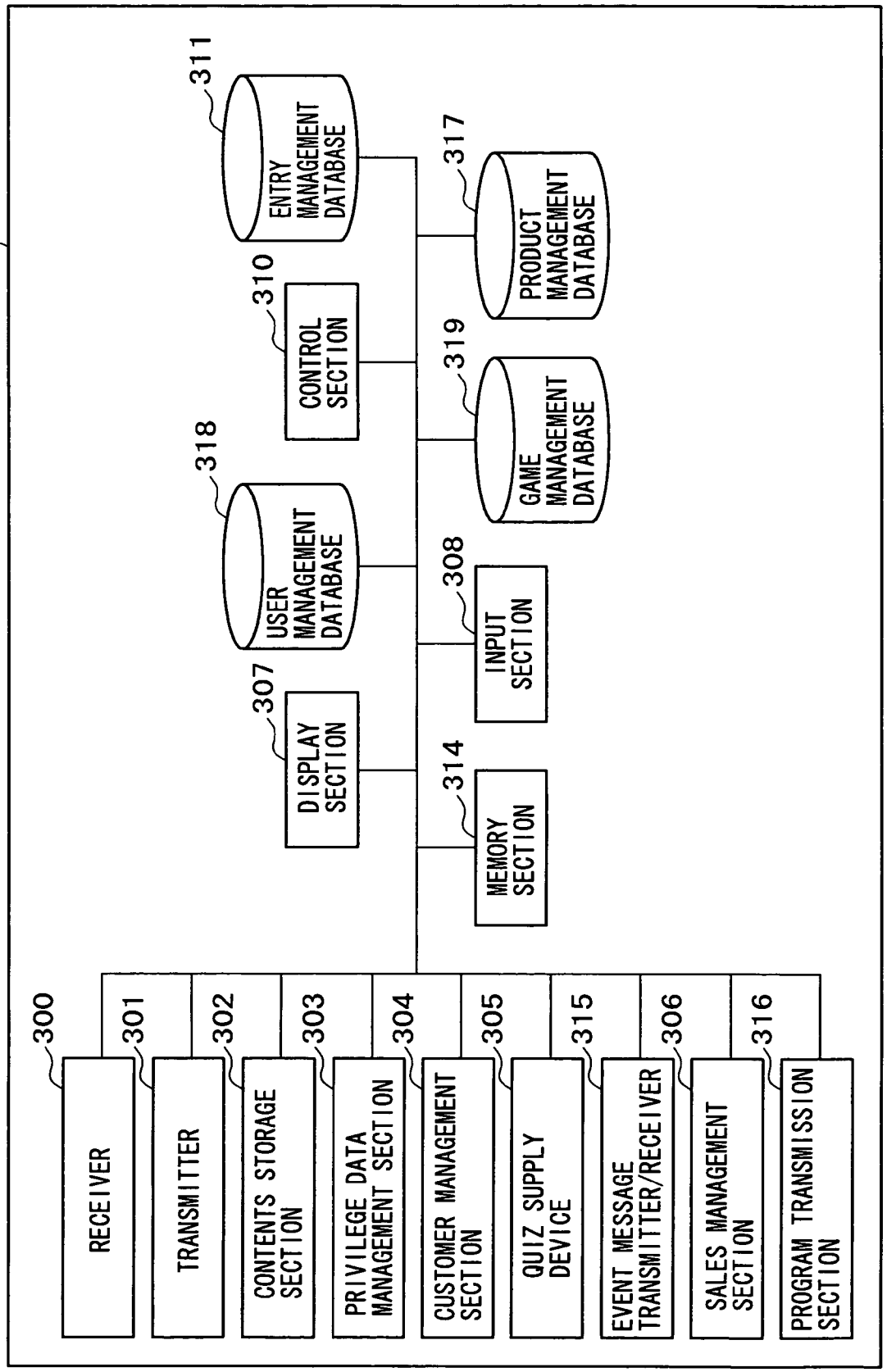
FIG. 42 is a block diagram illustrating a typical modified version of a privilege supply device for an interactive privilege supply system according to the second embodiment shown in FIG. 26.

The privilege supply device 108 shown in FIG. 26 and the privilege supply device 111 shown in FIG. 42 differ from the privilege supply device 108 shown in FIG. 26 in that the former two additionally include a program transmission section 316 for transmitting the program data to the antenna 102 provided for the user terminal device 101 and an event message transmitter/receiver 315 for transmitting at least event message data.

When, for instance, the quiz data transmitted via network 105 is transmitted as the event message data by the event message transmitter/receiver 315 via radio wave, the display section 223 can display, for example, the entry screen 911 for quiz entry during a program broadcast. Therefore, the use of network 105 is not always required; it is possible to supply, for instance, a quiz together with a program via radio wave.

7. Interactive Privilege Supply System Operation According to Third Embodiment

The operation by the interactive privilege supply system according to a third embodiment will now be described. The ensuing detailed description mainly deals with the differences between the third embodiment of an interactive privilege supply system and the second embodiment of an interactive privilege supply system.

7.1 Process for Supplying Privilege Data from Product Supply Device 104

Figure 43:
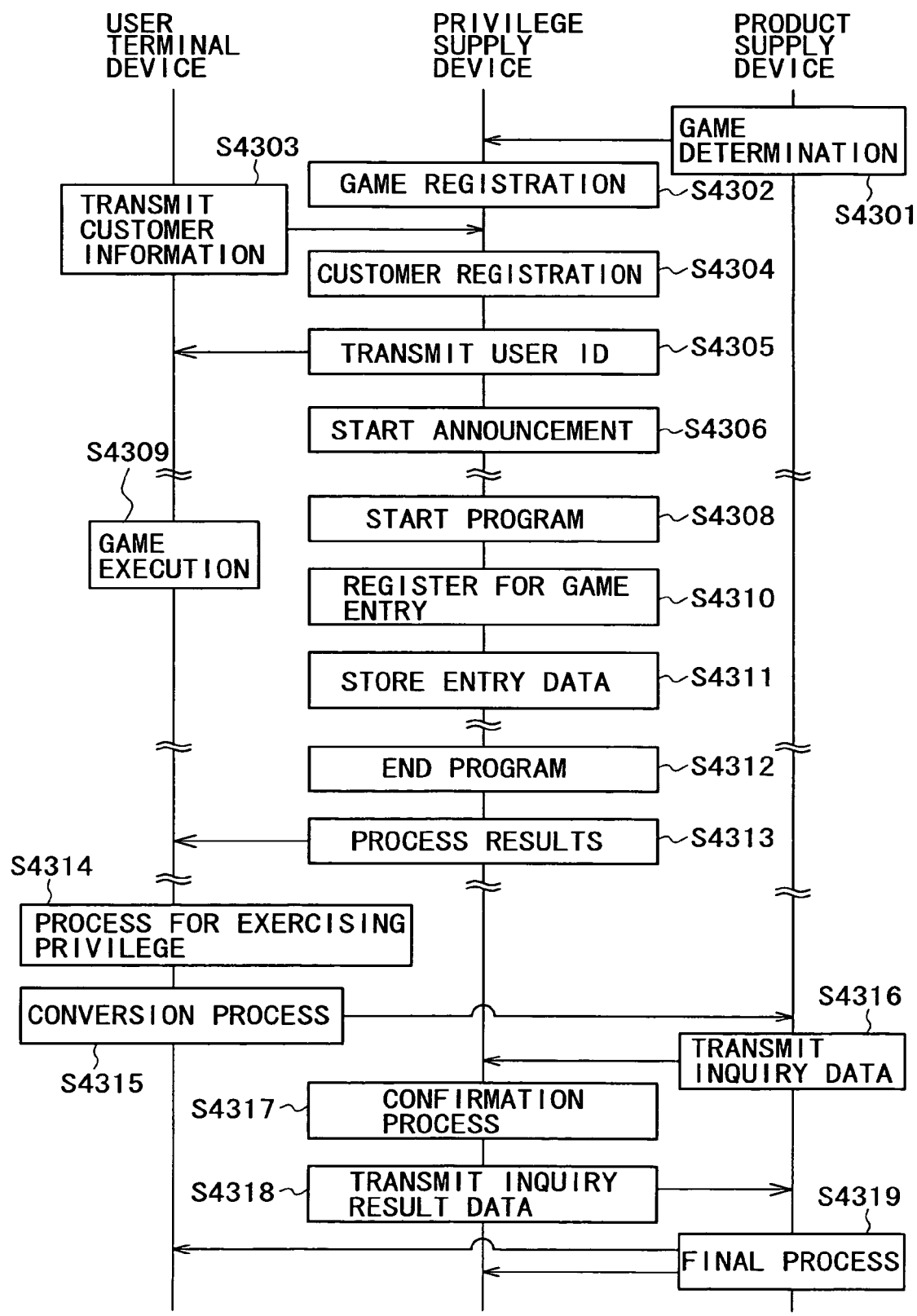
FIG. 43 is a flowchart that schematically illustrates the operation of an interactive privilege supply system according to a third embodiment.

The process for supplying privilege data from the product supply device 104 will now be described with reference to FIG. 43. FIG. 43 is a flowchart that schematically illustrates the operation of the interactive privilege supply system according to the third embodiment.

When the plan for a game is determined as indicated in FIG. 43, the product supply device 104 generates at least game registration data, privilege data, and quiz data for the game to be held, and then transmits them to the privilege supply device 108 (step S4301). The privilege data according to the third embodiment will not be described in detail because it has virtually the same structure as the privilege data according to the first embodiment.

The game registration data includes at least a game validity period between the entry in a game and the exercise of a privilege purchase right, an on-line site address of a sponsor for the transmitting end, a product ID or name of a privilege product, a quiz to be given during a game, and the time at which the quiz is displayed. As the on-line site address, a URL or the like is displayed.

In accordance with the above game registration data and privilege data, the privilege supply device 108 performs a registration process (step S4302). The registration process (step S4302) generates game information 325 in accordance with the game registration data, and assigns a new game ID to the game information 325. The game information 325 is stored in the game management database 319 after game ID assignment.

The above privilege data is received and managed by the privilege data management section 303. The privilege data is also set within the game information 325 in accordance with the product ID contained in the above game registration data. Further, the game ID contained in the game registration data is set within the product information 327, which is stored in the product management database 317. Even if the product ID according to the third embodiment is not contained in the game registration data, the product management database 317 may alternatively be searched for the product ID by using the product name contained in the game registration data in order to set the retrieved product ID.

7.2 Registration Process by User Terminal Device 101

The registration process performed by a user terminal device 101 according to the third embodiment will now be described.

User registration is required for a user terminal device 101 to participate in a game provided by the third embodiment of an interactive privilege supply system. When such user registration is recognized, unique identification information (user ID) is assigned to the user terminal device 101. This registration process can be completed not only at the time of pre-registration but also when an entry process is performed in game entry. Further, a password can be assigned to each user ID during the registration process.

Therefore, when the privilege supply device 108 is accessed, and at least the name, address, and phone number are entered from a registration screen (not shown), which are displayed on the display section 223 for the user terminal device 101, the user terminal device 101 generates registration data as shown in FIG. 36. The data structure of the registration data according to the third embodiment will not be described in detail because it is virtually the same as that of the registration data according to the second embodiment.

When the transmitter 220 of the user terminal device 101 transmits the above registration data to the privilege supply device 108 (step S4303), the customer management section 304 generates customer information 322 shown in FIG. 37 in accordance with the registration data. The customer information according to the second embodiment shown in FIG. 37 is virtually the same as the customer information according to the third embodiment. Therefore, the customer information according to the third embodiment will not be described in detail.

The customer management section 304 assigns a new user ID to the above registration data, sets a validity period as needed, and stores the customer information 322 in the user management database 318 as shown in FIG. 37. The customer registration process (step S4304) then terminates.

Upon termination of the customer registration process (step S4304), the privilege supply device 108 transmits the assigned user ID to the user terminal device 101 via network 105 (step S4305). This enables the user terminal device 101 to entry a game as a participant in accordance with the above user ID. The present invention can also be applied to a case where the user ID is encrypted before being transmitted.

7.3 Game Entry Process by User Terminal Device 101

When the customer registration process (step S4304) for user registration ends, transmitting a user ID to the user terminal device 101 (step S4305), a user belonging to the user terminal device 101 can entry in a game as indicated in FIG. 43.

Next, an announcement process begins, for instance, to convey the information on a game provided for a sports or other program and the information on a product that can be purchased by privilege through the game (step S4306). This announcement process continues till the end of the program. Alternatively, however, the announcement process may terminate in another manner.

The above announcement process (step S4306) is performed, as described in conjunction with the second embodiment, to display the announcement on an EPG (electronic program guide) screen, which is provided by a data broadcast and shown in FIG. 8, or on a Web page (not shown) provided by the privilege supply device 108. Although the third embodiment of an interactive privilege supply system is described with reference to a case where the announcement process is performed, the present invention can also be applied to a case where no announcement process is performed.

When the announcement process starts (step S4306), game entry is achievable. When a desired game and/or product is selected, for instance, from the above-mentioned EPG screen displayed on the user terminal device 101, a game screen 900 shown in FIG. 9 is displayed on the user terminal device 101.

As shown in FIG. 9, a main quiz is displayed on the game screen 900. The quiz appearing on the game screen according to the third embodiment is "What will be the batting average of Player XXX (uniform number 7) at the end of today's baseball game?". Alternatively, however, another quiz may be given. The contents of the game screen 900 according to the third embodiment will not be described in detail because they are virtually the same as those of the game screen according to the first embodiment, which are shown in FIG. 9.

When the "Entry" button is clicked or otherwise selected from the input section 222, an entry screen 931 is displayed on the display section 223 to prompt for game entry as shown in FIG. 44. The "Entry" button is selected after entering an answer to the main quiz and making some other entries in the input fields ("User ID", "Name", "Address", "Phone number", and "Answer to main quiz") within the entry screen 931. In the third embodiment, a user ID is inputted instead of a game user ID.

When the "Entry" button is selected, the user terminal device 101 generates entry data and transmits it to the privilege supply device 108 via network 105 to execute a game (step S4309). When the game is executed, a participant is entitled to win the right to make a privilege purchase of a desired product depending on the participant's response to the game.

Upon reception of the above entry data, the privilege supply device 108 checks the timing of data reception to determine whether or not a game is held. If the determination result is valid, the privilege supply device 108 generates game user information 323 in accordance with the entry data. If the determination result is invalid, on the other hand, a message is transmitted to the user terminal device to indicate that game entry is impossible (not shown).

Further, the customer management section 304 assigns a game user ID to the above game user information 323. The validity period set for the game information 325 about the game is then acquired and set within the game user information 323 as the validity period during which a privilege purchase can be made of a desired product.

When the validity period for exercising the right to make a privilege purchase is set within the game user information 323, a participant who answers a quiz correctly to win the right to make a privilege purchase can make a privilege purchase of a desired product within the validity period. Therefore, when the validity period is used to establish a deadline for time limitation purposes, a user belonging to the user terminal device 101 can be highly motivated to make a purchase.

When the game user information 323 is stored in the user management database 318 after the validity period and game user ID are set within the game user information 323, the game entry registration process (step S4310) terminates. The game user information 323 is newly generated upon each game entry (game execution) and stored in the user management database 318. Therefore, it can be managed, for instance, as a game entry history of each user. The privilege supply device 108 stores the received entry data in the entry management database 311 (step S4311).

The above entry data is stored till the end of a game. In the third embodiment, it is assumed that the game execution process (step S4309) is performed after the start of a program. However, the present invention can also be applied to a case where the game execution process is otherwise timed. For example, the game execution process may be performed in the form of full entry according to the first embodiment during the time interval between the instant at which the announcement process starts (step S4306) and the instant at which a program starts (step S4308).

7.4 Game Result Process by Privilege Supply Device 108

The game ends the moment the program ends (step S4312), and the correct answer to the given quiz is determined. The quiz supply section 305 performs a result process on the entry data stored in the entry management database 311 in accordance with the determined correct answer to the quiz (step S4313).

The above result process (step S4313) checks participants' answers within entry data transmitted from one or more user terminal devices 101, which are stored in the entry management database 311, and initializes (clears) or resets the validity period setting for the game user information 323 about a game user ID for entry data involving an incorrect answer. For a correct answer, no such reset is performed, and the above validity period remains effective so that the right to make a privilege purchase is granted.

After termination of the result process (step S4613), the privilege supply device 108 transmits result data to a user terminal device 101 that has the right to make a privilege purchase the validity period of which is still effective. The result data transmitted in this manner includes at least the associated user ID, the game user ID, and the on-line site address for the product supply device 104.

When the user terminal device 101 having the right to make a privilege purchase receives the transmitted result data, it stores a set of the above user ID, game user ID, and on-line site address in the memory section 225 or storage section 226.

7.5 Privilege Purchase Process by Privilege Supply Device 108

A participant who belongs to a user terminal device 101 that won the right to make a privilege purchase of a desire product by answering a quiz correctly can purchase a product, for instance, at a predetermined discount rate (can make a privilege purchase). However, the privilege purchase can be made of a desired product only during the validity period that is set in the game user information 323.

When making a privilege purchase of a product, a WWW browser or other browsing software or character communication software stored in the memory section 225 or storage section 226 starts and the user terminal device 101 accesses the product supply device 104 in accordance with the above-mentioned on-line site address. The character communication software is the software that effects data communication upon character input.

Figure 45:
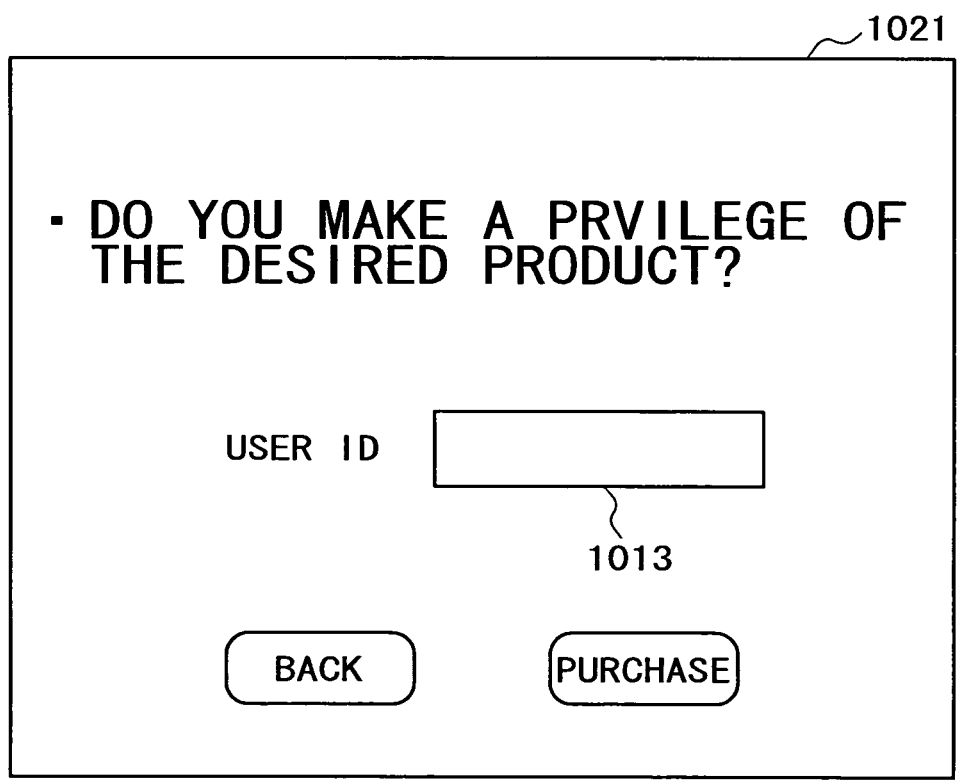
FIG. 45 illustrates the contents of a screen that is displayed on a user terminal device for an interactive privilege supply system according to the third embodiment.

When the user terminal device 101 selects a desired product ID or product name via the browsing software or character communication software and transmits the selection to the product supply device 104, a purchase screen 1021 for making a privilege purchase is displayed on the user terminal device 101 as shown in FIG. 45.

When the "Purchase" button is clicked or otherwise selected after a user ID for the user terminal device 101 is inputted into the "User ID" input field shown in FIG. 45 from the input section 222 of the user terminal device 101, purchase application data, which is used to exercise the right to make a privilege purchase of a product, is generated (step S4314). When the purchase application data is generated, it is considered that the right to make a privilege purchase of the product is exercised.

When the purchase application data is generated, the browsing software or character communication software stored in the privilege supply device 108 automatically converts the above user ID to a game user ID (step S4315).

The browsing software or character communication software is capable of converting a user ID to a game user ID when transmitting data containing a user ID to a device other than the privilege supply device 108.

Therefore, a user belonging to the user terminal device 101 does not have to manage both the user ID and game user ID and simply has to manage the user ID only. This results in an increase in the efficiency of an update application data generation process.

After the user ID stored in the above-mentioned set is converted to a game user ID (step S4315), the purchase application data is transmitted to the product supply device 104 that corresponds to the on-line site address stored in the set. When the purchase application data according to the third embodiment is transmitted, the present invention can also be applied to a case where a format check is conducted to determine whether or not a user ID is set within the purchase application data.

Upon reception of the above purchase application data, the product supply device 104 generates inquiry data for inquiring about the purchase application data (not shown) and transmits it to the privilege supply device 108 (step S4316). The inquiry data contains at least a game user ID.

In accordance with the above inquiry data, the customer management section 304 of the privilege supply device 108 performs a confirmation process (step S4317). The confirmation process (step S4317) uses a game user ID contained in the inquiry data as a key to search for the game user information 323 stored in the user management database 318.

When the game user information 323 is retrieved as a result of the above search, the customer management section 304 calculates the validity period, which can be derived from an absolute or relative time value set within the game user information 323, in order to determine whether or not a privilege purchase can be made. The process for determination according to the third embodiment will not be described in detail because it is virtually the same as the determination process according to the second embodiment.

When the result of determination is valid, the customer management section 304 generates inquiry result data containing a user name, address, and phone number that are set within the customer information 322 for the game user ID, and transmits the generated data to the product supply device 104 via network 105 (step S4318).

If, on the other hand, the result of determination is invalid, the customer management section 304 generates invalid inquiry result data, which does not contain the customer information 322, and transmits the generated data to the product supply device 104 via network 105 (step S4318).

Upon reception of the above inquiry result data, the product supply device 104 determines whether or not the customer information 322 is contained. If the customer information 322 is contained, the product supply device 104 concludes that a valid right is to be exercised, and then performs a final process for validating the exercise of the right (step S4319).

If, on the other hand, the customer information 322 is not contained, the product supply device 104 concludes that an invalid right is to be exercised, and then performs a final process for invalidating the exercise of the right (step S4319) by transmitting message data to the user terminal device 101 to indicate that the right to make a privilege purchase of a product cannot be exercised because it is invalid.

In accordance with the above customer information 322, the product supply device 104 constructs and manages the customer information database (not shown). This makes it possible to make good use of the customer information as the information for a close market.

Further, the product supply device 104 need not be equipped with the user management database 318, which is provided for the privilege supply device 108. Therefore, the running cost, management cost, or other similar cost for the user management database 318 can be reduced.

A user ID assigned to a user belonging to the user terminal device 101 is not transmitted to the product supply device 104. Instead, a game user ID is exchanged between the user terminal device 101 and product supply device 104. It is therefore possible to conceal the user ID, which closely relates to personal information, thereby reducing the possibility of personal information leakage to the outside.

The above final process for validating the exercise of the right generates delivery data, which contains the name, address, and other information about the user, in order to deliver a specified product, and generates settlement data by calculating the product price at a predetermined discount rate.

The product supply device 104 transmits the above settlement data to a banking institution managing the user's personal account or a credit card or other company having a contract with the user. Settlement result data, which is generated upon settlement, is transmitted to the user terminal device 101 (step S4318).

In accordance with the sale of a product purchased by privilege, the charge calculation section 403, which is provided for the product supply device 104, calculates the charge as a royalty, generates royalty payment data, and transmits the generated data to the privilege supply device 108. The royalty is separately paid into an account with a banking institution for the privilege supply device 108. A series of processing steps is now completed by the third embodiment of an interactive privilege supply system.

The third embodiment of an interactive privilege supply system has been described with reference to a case where only the main quiz is given. However, the present invention can also be applied to a case where a plurality of quizzes are given.

The third embodiment of an interactive privilege supply system has been described with reference to a case where a game is held only once. However, the present invention can also be applied to a case where a game is held multiple times on a periodic basis. The present invention is applicable to a case where a game is held multiple times on a plurality of channels on the same day. Therefore, the right to make a privilege purchase of a product can be newly granted in accordance with the cumulative record of a user belonging to the user terminal device 101, which can be derived from the results of a plurality of games.

Unlike a storage type service that permits product purchase at any time, the third embodiment of an interactive privilege supply system can promote sales by, for instance, limiting the privilege purchase period for a product to three days.

Further, the third embodiment of an interactive privilege supply system differs from a sponsor's commercial message, which is announced over a limited period of time during a normal broadcast program, in that the former, for example, enables the sponsor's product to be visually recognized through a game and renders it purchasable. With the third embodiment of an interactive privilege supply system, it is therefore possible to make use of the whole program as a commercial message in coordination with an interactive service.

When, for instance, a sports or other live broadcast program coordinates with a game or other interactive service in real time, the third embodiment of an interactive privilege supply system permits the audience to participate in real time unlike a prerecorded broadcast program so that the audience rating of a live broadcast program can be increased.

The third embodiment of an interactive privilege supply system has been described with reference to a case where the user terminal device 101 and privilege supply device 108 are interconnected via network 105. However, the present invention can also be applied, for instance, to a case where the user terminal device 101 and privilege supply device 108 are interconnected via radio wave for use in a data broadcast and/or network 105. A typical modified version of the third embodiment of an interactive privilege supply system will not be described in detail because it has virtually the same configuration as the typical modified version of the second embodiment of an interactive privilege supply system shown in FIG. 42.

8. Interactive Privilege Supply System Operation according to a Fourth Embodiment The operation performed by the interactive privilege supply system according to a fourth embodiment will now be described. The ensuing detailed description mainly deals with the differences between the fourth embodiment of an interactive privilege supply system and the second embodiment of an interactive privilege supply system.

8.1 Process for Supplying Privilege Data from Product Supply Device 104

Figure 46:
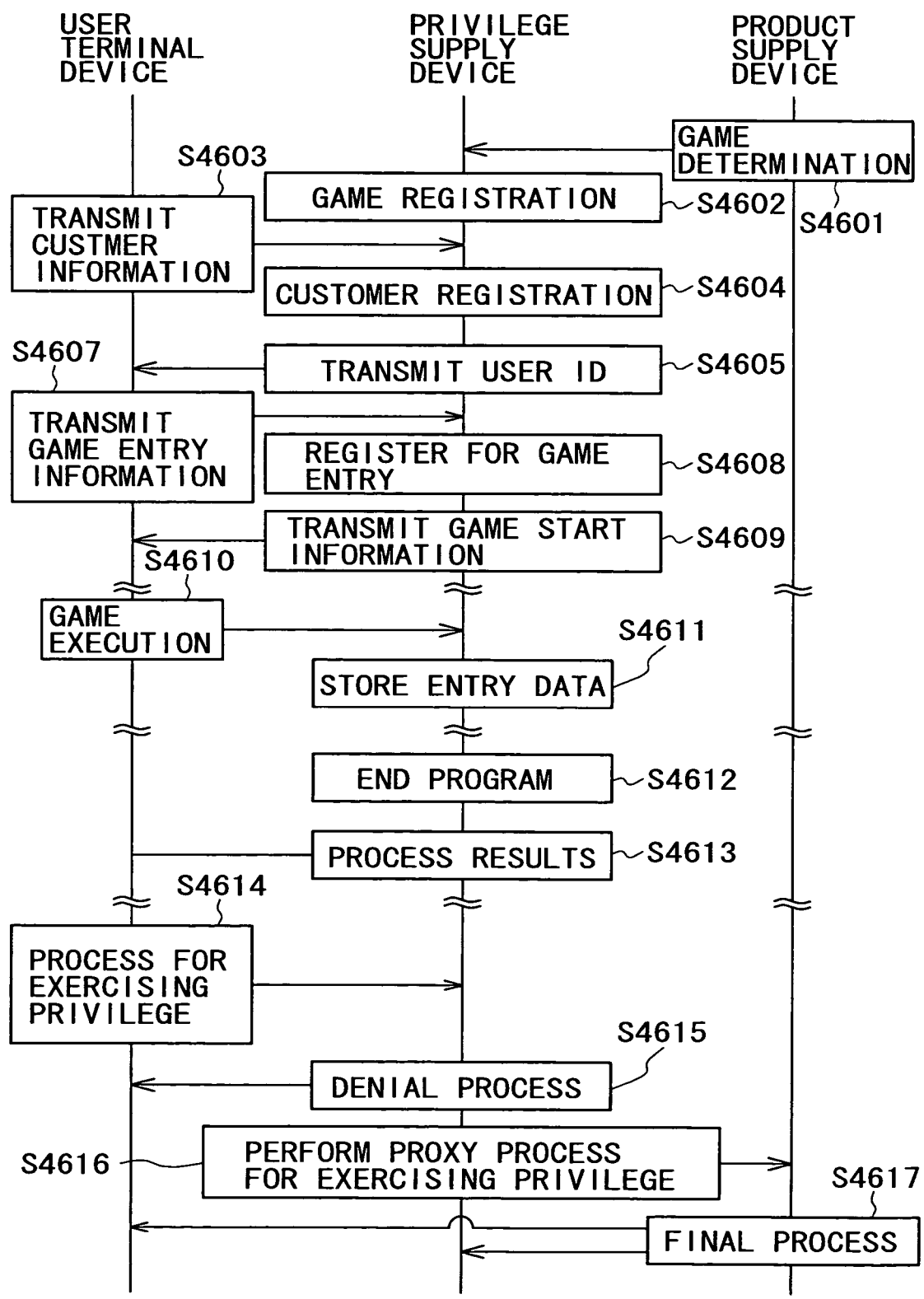
FIG. 46 is a flowchart that schematically illustrates the operation of an interactive privilege supply system according to a fourth embodiment.

The process for supplying privilege data from the product supply device 104 will now be described with reference to FIG. 46. FIG. 46 is a flowchart that schematically illustrates the operation of the interactive privilege supply system according to the fourth embodiment.

When the plan for a game is determined as indicated in FIG. 46, the product supply device 104 generates at least game registration data, privilege data, and quiz data for the game to be held, and then transmits them to the privilege supply device 108 (step S4601). The privilege data according to the fourth embodiment will not be described in detail because it has virtually the same structure as the privilege data according to the second embodiment.

The above game registration data includes at least a game validity period between the entry in a game and the exercise of a privilege purchase right, an on-line site address of a sponsor for the transmitting end, a product ID or name of a privilege product, a quiz to be given during a game, and the time at which the quiz is displayed. As the on-line site address, a URL or the like is displayed.

In accordance with the above game registration data and privilege data, the privilege supply device 108 performs a registration process (step S4602). The registration process (step S4602) generates game information 325 in accordance with the game registration data, and assigns a new game ID to the game information 325. The game information 325 is stored in the game management database 319 after game ID assignment.

The above privilege data is received and managed by the privilege data management section 303. Further, a game ID is set in the product information 327 stored in the product management database 317 in accordance with the product ID contained in the above game registration data. Even if the product ID according to the fourth embodiment is not contained in the game registration data, the product management database 317 may alternatively be searched for the product ID by using the product name contained in the game registration data in order to set the retrieved product ID.

8.2 Registration Process by User Terminal Device 101

The registration process performed by a user terminal device 101 according to the fourth embodiment will now be described.

User registration is required for a user terminal device 101 to participate in a game provided by the fourth embodiment of an interactive privilege supply system. When such user registration is recognized, unique identification information (user ID) is assigned to the user terminal device 101. This registration process can be completed not only at the time of pre-registration but also when an entry process is performed for participating in a game. Further, a password can be assigned to each user ID during the registration process.

Therefore, when the privilege supply device 108 is accessed, and at least the name, address, and phone number are entered from a registration screen (not shown), which are displayed on the display section 223 for the user terminal device 101, the user terminal device 101 generates registration data as shown in FIG. 36. The data structure of the registration data according to the fourth embodiment will not be described in detail because it is virtually the same as that of the registration data according to the second embodiment.

When the transmitter 220 of the user terminal device 101 transmits the above registration data to the privilege supply device 108 (step S4603), the customer management section 304 generates customer information 322 shown in FIG. 37 in accordance with the registration data. The customer information according to the second embodiment shown in FIG. 37 is virtually the same as the customer information according to the fourth embodiment. Therefore, the customer information according to the fourth embodiment will not be described in detail.

The customer management section 304 assigns a new user ID to the above registration data, sets a validity period as needed, and stores the customer information 322 in the user management database 318 as shown in FIG. 37. The customer registration process (step S4604) then terminates.

Upon termination of the customer registration process (step S4604), the privilege supply device 108 transmits the assigned user ID to the user terminal device 101 via network 105 (step S4605). This enables the user terminal device 101 to take part in a game as a participant in accordance with the above user ID. The present invention can also be applied to a case where the user ID is encrypted before being transmitted.

8.3 Game Execution Process by User Terminal Device 101

When the user ID is transmitted to the user terminal device 101 (step S4605), a user belonging to the user terminal device 101 can participate in a game as indicated in FIG. 46.

When the user terminal device 101 is used to select a desired game and a desired product that can be purchased by privilege from an EPG screen or the like, a game screen 910 shown in FIG. 38 is displayed on the user terminal device 101. As indicated in FIG. 38, the game screen 910 reads "Do you participate in today's game?". The contents of the game screen 910 according to the fourth embodiment will not be described in detail because they are virtually the same as those of the game screen 910 according to the second embodiment.

When, for instance, the "Entry" button is clicked or otherwise selected from the input section 222, an entry screen 911 is displayed on the display section 223 to prompt for game entry as shown in FIG. 39. The contents of the entry screen 911 according to the fourth embodiment will not be described in detail because they are virtually the same as those of the entry screen 911 according to the second embodiment, which are shown in FIG. 39.

As shown in FIG. 39, the entry screen 911 is provided with input fields for "User ID", "Name", "Address", "Phone number", and "Desired product". Therefore, if, for instance, the "User ID" of a participant belonging to the user terminal device 101 is "AAA", "AAA" is entered in the "User ID" input field. If the desired product is "goods1", "goods1" is entered in the "Desired product" input field.

When the "Entry" button is clicked or otherwise selected after completion of input into the above input fields, the user terminal device 101 generates game entry information in accordance with the information entered in the above input fields and transmits the generated information to the privilege supply device 108 via network 105 (step S4607).

When the game entry information is transmitted to the privilege supply device 108, the customer management section 304 searches the game management database for the associated customer information 322 in accordance with the user ID that is set within the game entry information.

When the customer information 322 in which the user ID is set is obtained, the customer management section 304 generates game user information 323 by setting a validity period, a desired product, or the like within the game user information 323, and stores the generated information in the user management database 318 in such a manner that it is linked to the associated customer information 322. When the desired privilege product "goods1" is to be set in the game user information 323, the definition "ref_goods="goods1"" is written in the "game_user" tag. However, the present invention can also be applied to a different definition.

When the above game user information 323 is stored in the user management database 318, the customer management section 304 assigns a game user ID to the game user information 323 to conclude a game entry registration process (step S4608). The game user information 323 is generated anew upon each game entry and stored in the user management database 318. Therefore, the game user information can be managed, for instance, as a game entry history of each user.

When the specified time arrives or a program starts, the privilege supply device 108 transmits game start information, which indicates the beginning of a game (step S4609). Upon reception of the game start information, the user terminal device 101 opens a game screen 900, which displays a main quiz for today's game as shown in FIG. 9, making it possible to execute a game at an appropriate time. The contents of the game screen 900 according to the fourth embodiment will not be described in detail because they are virtually the same as those of the game screen 900 according to the first embodiment, which are shown in FIG. 9.

The above game screen 900 opens when the quiz supply section 305 transmits quiz data stored in the memory section 314 via network 105. A participant can answer the main quiz by clicking the mouse on the "Entry" button or otherwise selecting it from the user terminal device 101.

When the "Entry" button is selected, for instance, by clicking the mouse on it, the entry screen 901 shown in FIG. 10 is displayed on the user terminal device 101. The "Entry" button is selected after entering, for instance, the user ID and the answer to the main quiz in the "User ID" and "Answer to main quiz" input fields. The contents of the entry screen 901 according to the fourth embodiment will not be described in detail because they are virtually the same as those of the entry screen 901 according to the first embodiment, which are shown in FIG. 10.

Upon "Entry" button selection, the user terminal device 101 generates entry data and transmits it to the privilege supply device 108 via network 105 to execute a game (step S4610). When the game is executed, it is possible that the participant may win the right to purchase a desired product by privilege depending on the response to the game.

Upon reception of the above entry data, the privilege supply device 108 determines whether or not the time of entry data reception is within the period for holding a game. If the reception time is within the period for holding a game, the privilege supply device 108 stores the entry data in the entry management database 311 (step S4611). If the determination result is invalid, a message is transmitted to the user terminal device to indicate that game entry is impossible (not shown).

In the fourth embodiment of game execution (step S4610), there is no need to transmit a game user ID to the privilege supply device 108. Therefore, the user terminal device 101 simply has to manage the user ID only.

The above entry data is stored till the end of a game. In the second embodiment, it is assumed that the game execution process (step S4610) is performed after the start of a program. However, the present invention can also be applied to a case where the game execution process is otherwise timed. For example, the game execution process may be performed in the form of full entry according to the first embodiment before game start information transmission (step 4609).

8.4 Game Result Process by Privilege Supply Device 108

The game ends the moment the program ends (step S4612), and the correct answer to the given quiz is determined. The quiz supply section 305 performs a result process on the entry data stored in the entry management database 311 in accordance with the determined correct answer to the quiz (step S4613).

The above result process (step S4613) checks participants' answers within entry data transmitted from one or more user terminal devices 101, which are stored in the entry management database 311, and initializes (clears) the validity period setting for the game user information 323 about a game user ID for entry data involving an incorrect answer or sets "invalid information" or the like. For a correct answer, the validity period setting is not re-updated within the game user information 323 and is stored as a validity period that indicates the period during which a privilege purchase can be made.

After termination of the result process (step S4313), the privilege supply device 108 transmits result data to a user terminal device 101 that has the right to make a privilege purchase. The result data transmitted in this manner includes at least a validity period during which a privilege purchase can be made, the associated user ID, the game user ID, and the on-line site address for the product supply device 104.

8.5 Privilege Purchase Process by Privilege Supply Device 108

A participant who belongs to a user terminal device 101 that won the right to make a privilege purchase of a desire product by answering a quiz correctly can purchase a product, for instance, at a predetermined discount rate (can make a privilege purchase). However, the privilege purchase can be made of a desired product only during the validity period that is set in the game user information 323.

When making a privilege purchase of a product, the user terminal device 101 first transmits a user ID to the privilege supply device 108 and then accesses the on-line site for the privilege supply device 108. A purchase screen 1021 for making a privilege purchase, which is shown in FIG. 45, is displayed on the user terminal device 101.

When the "Purchase" button is clicked or otherwise selected after the user ID for the user terminal device 101 is entered into the "User ID" input field 1013 shown in FIG. 45. from the input section 222 of the user terminal device, purchase request data is generated and transmitted to the privilege supply device 108 in order to request the privilege supply device 108 to exercise the right to make a privilege purchase (step S4614). The purchase request data contains at least a user ID.

When requested to perform a process for exercising the right to make a privilege purchase Upon reception of the above purchase request data, the privilege supply device 108 searches for the game user information 323 by using a user ID set within the purchase request data as a key.

When the game user information 323 is retrieved as a result of the above search, the validity period setting in the game user information 323 is checked to determine whether or not it is within the period during which a privilege purchase can be made. The determination process according to the fourth embodiment will not be described in detail because it is virtually the same as the determination process according to the second embodiment.

If the result of the above determination is invalid, a denial process is performed (step S4615). In the denial process, the customer management section 304 generates message data, which indicates that the exercise of the right is invalid, and transmits the generated data to the user terminal device 101 via network 105 (step S4615).

If, on the other hand, the result of the above determination is valid, the customer management section 304 generates purchase application data, which contains a game user ID and the name, address, phone number, and other information about a user that are set within the customer information 322 for the game user ID, and transmits the generated data to the product supply device 104 via network 105 (step S4616). In other words, the privilege supply device 108 transmits the purchase application data to the product supply device 104 in order to exercise the right to make a privilege purchase as a proxy for the user terminal device 101.

Consequently, the privilege supply device 108 can determine without receiving inquiry data from the product supply device 104 whether or not a privilege purchase is about to be made by the user terminal device 101. As a result, the efficiency of the determination process increases.

The product supply device 104 performs a final process (step S4617) in accordance with the above purchase application data. The final process (step S4617) generates delivery data, which contains the name, address, and other information about the user, in order to deliver a product specified by the user terminal device 101, and generates settlement data by calculating the product price at a predetermined discount rate.

The product supply device 104 transmits the above settlement data to a banking institution managing the user's personal account or a credit card having a contract with the user. Settlement result data, which is generated upon settlement, is transmitted to the user terminal device 101 (step S4617).

In accordance with the sale of a product purchased by privilege, the charge calculation section 403, which is provided for the product supply device 104, calculates the charge as a royalty, generates royalty payment data, and transmits the generated data to the privilege supply device 108. The royalty is separately paid into an account with a banking institution for the privilege supply device 108. A series of processing steps is now completed by the fourth embodiment of an interactive privilege supply system.

The product supply device 104 need not be equipped with the user management database 318, which is provided for the privilege supply device 108. Therefore, the running cost, management cost, or other similar cost for the user management database 318 can be reduced.

In accordance with the above purchase application data, the product supply device 104 constructs and manages the customer information database (not shown). It is therefore possible to make good use of the customer information as the strategic information for a close market.

Further, a user ID assigned to a user belonging to the user terminal device 101 is not transmitted to the product supply device 104. Instead, a game user ID is exchanged between the user terminal device 101 and product supply device 104. This makes it possible to minimize the possibility of allowing a user ID, which closely relates to personal information, to leak to the outside.

The fourth embodiment of an interactive privilege supply system has been described with reference to a case where only the main quiz is given. However, the present invention can also be applied to a case where pluralities of quizzes are given.

Further, the fourth embodiment of an interactive privilege supply system has been described with reference to a case where a game is held only once. However, the present invention can also be applied to a case where a game is held multiple times on a periodic basis. The present invention is applicable to a case where a game is held multiple times on a plurality of channels on the same day. Therefore, the right to make a privilege purchase of a product can be newly granted in accordance with the cumulative record of a user belonging to the user terminal device 101, which can be derived from the results of a plurality of games.

Unlike a storage type service that permits product purchase at any time, the fourth embodiment of an interactive privilege supply system can promote sales by, for instance, limiting the privilege purchase period for a product to 3 days.

Further, the fourth embodiment of an interactive privilege supply system differs from a sponsor's commercial message, which is announced over a limited period of time during a normal broadcast program, in that the former, for example, enables the sponsor's product to be visually recognized through a game and renders it purchasable. With the fourth embodiment of an interactive privilege supply system, it is therefore possible to make use of the whole program as a commercial message in coordination with an interactive service.

When, for instance, a sports or other live broadcast program coordinates with a game or other interactive service in real time, the fourth embodiment of an interactive privilege supply system permits the audience to participate in real time unlike a prerecorded broadcast program so that the audience rating of a live broadcast program can rise.

The fourth embodiment of an interactive privilege supply system has been described with reference to a case where the user terminal device 101 and privilege supply device 108 are interconnected via network 105. However, the present invention can also be applied, for instance, to a case where the user terminal device 101 and privilege supply device 108 are interconnected via radio wave for use in a data broadcast and network 105. A typical modified version of the fourth embodiment of an interactive privilege supply system will not be described in detail because it has virtually the same configuration as the typical modified version of the second embodiment of an interactive privilege supply system shown in FIG. 42.

While preferred embodiments of the present invention have been described with reference to the accompanying drawings, such description is for illustrative purpose only.

Persons of skill in the art will appreciate that changes and variations may be made without departure from the spirit or scope of the scope of the appended claims.

In the foregoing embodiments, it is assumed that the game during which a quiz is given is a quiz game. Alternatively, however, the quiz may be, for instance, a sports game or roll playing game.

In the foregoing embodiments, it is also assumed that the user terminal devices and privilege supply device are interconnected via network 105. However, the present invention can also be applied, for instance, to a case where the user terminal devices and privilege supply device are interconnected via radio wave for use in a data broadcast and/or a network.

In the foregoing embodiments, it is also assumed that a baseball program is broadcast. However, the present invention is also applicable when any genre of program is broadcast. For example, the present invention can be applied to a live soccer game broadcast during which the users can view a soccer game and predict the score of the game.

In the foregoing embodiments, it is also assumed that a game is supplied from the privilege supply device. However, the present invention can also be applied to a case where a game is supplied in the form, for instance, of a quiz, EPG service, or questionnaire.

Further, the foregoing embodiments have been described with reference to a case where a product is supplied from the product supply device. However, the present invention can also be applied to a case where a delivery or other similar service is provided.

As described above, the present invention makes it possible to establish a business model that provides a privilege interactively by means of a Web or other similar network and/or a data broadcast. The present invention also contributes toward raising the audience rating of a broadcast program by coordinating with an interactive game or other similar service. Further, the product to be supplied in coordination with an interactive game or other similar service can be advertised so as to add new sales channels. Furthermore, a game or other similar service that is supplied in real time can be used to promote the purchase of products, thereby increasing the sales of the products. In addition, the coordination with an interactive service makes it possible to determine the most frequently accessed time periods and gather other information about a program's audience.

While the preferred embodiments of the present invention have been described using specific terms, such description is for illustrative purposes only, and it is to be understood that changes and variations may be made without departing from the spirit or scope of the appended claims.

What is claimed is:

1. An interactive privilege supply system in which a user terminal device, a privilege supply device, and a product supply device are connected via a network, wherein said product supply device includes means for generating privilege data in which a privilege is interlocked with time;

said user terminal device includes means for generating entry data within a predetermined period of time in accordance with said privilege data and contingency data, which is contained in program data for a broadcast program, wherein said program data is transmitted at least from said privilege supply device, and wherein at least a portion of said contingency data is intended to induce viewer interest in said broadcast program and to promote sales of any of a product and service associated with said privilege data; and said privilege supply device includes means for generating result data, which contains validity period information about product privilege purchase, in accordance with a relationship between said contingency data and said entry data, and wherein said privilege supply device uses an electronic program guide (EPG) for a data broadcast or a home page to announce said contingency data, and wherein said viewer can view more information concerning said contingency data by interactively selecting a portion of said EPG data associated with said contingency data, the more information concerning said contingency data varying on a program-to-program basis, the more information including information indicative of a game relating to the program and a product, the game being a game in which the viewer may participate, and the product being a product that the viewer may purchase at a reduced cost by using points accumulated according to the viewer's success in the game, the viewer's success in the game being related to the accuracy with which the viewer can predict an outcome to occur within the broadcast program, wherein the broadcast program is a live event whose subject is defined as the event transpires, and wherein the viewer can participate in the game before and after start of transmission of the program data for the broadcast program related to the game for reception by the user terminal device, wherein said privilege data represents a number of points for providing to the viewer as a privilege, based on participation by the viewer in the game relating to the program, wherein the number of points is dependent upon a timing relationship between a time at which the viewer causes the user terminal device to generate the entry data for the game and a time at which transmission of the program data for the program related to the game for reception by the user terminal device starts, wherein, when the entry data for the game is caused to be generated before the start of transmission of the program data for the program related to the game, a first number of points is providable to the viewer as the privilege and, when the entry data for the game is caused to be generated after the start of transmission of the program data for the program related to the game, a second number of points is providable to the viewer as the privilege, wherein the first number of points exceeds the second number of points.

2. The interactive privilege supply system according to claim 1, wherein said privilege is interlocked with the time at which said entry data is generated.

3. The interactive privilege supply system according to claim 1, wherein said predetermined period of time is a time interval between a beginning and end of a program.

4. The interactive privilege supply system according to claim 1, wherein a plurality of said contingency data are generated within said predetermined period of time.

5. The interactive privilege supply system according to claim 1, wherein said contingency data relates to said program data.

6. The interactive privilege supply system according to claim 1, wherein said privilege supply device manages said entry data in accordance with entry identification information.

7. The interactive privilege supply system according to claim 6, wherein said entry identification information is associated with said validity period information.

8. The interactive privilege supply system according to claim 1, wherein said privilege supply device conceals user identification information for identifying said user terminal device for said product supply device.

9. An interactive privilege supply system as claimed in claim 1, wherein said number of points decreases based on an amount of time elapsed from the start time at which the transmission of the program to the viewer starts to the time at which the entry data is generated for the game related to the program.

10. An interactive privilege supply system as claimed in claim 9, wherein said number of points decreases based on amount of time elapsed from the start time at which broadcast of the program to a multiplicity of viewers starts to the time at which the entry data is generated for the game related to the program.

11. An interactive privilege supply system as claimed in claim 1, wherein said privilege supply device further includes means for receiving from said product supply device a royalty for a product privilege purchase.

12. The interactive privilege supply system as claimed in claim 1, wherein a degree of difficulty of the game decreases after the start of transmission of the program data for the broadcast program.

13. An interactive privilege supply system comprising:
a user terminal device;
a product supply device operable to transmit product data indicative of a product obtainable by privilege and generate privilege data in which a privilege is interlocked with time;
a privilege supply device operable to (i) receive said product data from said product supply device, (ii) transmit an announcement of a game or quiz relating to a sports program along with said product data by use of an electronic program guide (EPG) for reception by said user terminal device, wherein at least a portion of the game or quiz is intended to induce viewer interest in said sports program, and to promote sales of the product obtainable by privilege; (iii) transmit said sports program and said game or quiz relating to said sports program for reception by said user terminal device, and (iv) generate result data indicative of a result of said game or quiz and cause information indicative of the result to be supplied to the user terminal device, and wherein the viewer can view more information concerning said game or quiz by interactively selecting a portion of said EPG data associated with said game or quiz, the more information concerning the game or quiz varying on a program-to-program basis, the more information including information indicative of the game or quiz relating to the program and a product, the game or quiz being, respectively, a game or quiz in which the viewer may participate, and the product being a product that the viewer may purchase at a reduced cost by using points accumulated according to the viewer's success in the game or quiz, the viewer's success in the game or quiz being related to the accuracy with which the viewer can predict an outcome to occur within the program, wherein the program is a live event whose subject is defined as the event transpires, and wherein the viewer can participate in the game or quiz before and after start of transmission of the program data for the program related to the game for reception by the user terminal device, wherein said privilege data represents a number of points for providing to the viewer as a privilege, based on participation by the viewer in the game or quiz relating to the program, wherein the number of points is dependent upon a timing relationship between a time at which entry data for the game or quiz is generated by the viewer using the user terminal device to a time at which transmission of the program related to the game or quiz for reception by the user terminal device starts, wherein, when the entry data for the game or quiz is caused to be generated before the start of transmission of the program data for the program related to the game or quiz, a first number of points is providable to the viewer as the privilege and, when the entry data for the game is caused to be generated after the start of transmission of the program data for the program related to the game or quiz, a second number of points is providable to the viewer as the privilege, wherein the first number of points exceeds the second number of points.

14. An interactive privilege supply system as claimed in claim 13, wherein said number of points decreases based on an amount of time elapsed from the start time at which the transmission of the program to the viewer starts to the time at which the entry data is generated for the game or quiz related to the program.

15. An interactive privilege supply system as claimed in claim 14, wherein said number of points decreases based on an amount of time elapsed from the start time at which broadcast of the program to a multiplicity of viewers starts to the time at which the entry data is generated for the game or quiz related to the program.

16. An interactive privilege supply system as claimed in claim 13, wherein said privilege supply device further includes means for receiving from said product supply device a royalty for a product privilege purchase.

17. An interactive privilege supply system comprising:
first and second user terminal devices associated, respectively, with first and second viewers;
a product supply device operable to:
transmit product data indicative of a product obtainable by privilege;
generate first privilege data in which a first privilege is interlocked with time; and
generate second privilege data in which a second privilege is interlocked with the time;
a privilege supply device operable to:
receive said product data from said product supply device,
transmit an announcement of a game or quiz relating to a sports program along with said product data by use of an electronic program guide (EPG) for reception by said first and second user terminal device, wherein said at least a portion of the game or quiz is intended to induce viewer interest in said sports program and to promote sales of the product obtainable by privilege, and wherein said first and second viewers can view more information concerning said game or quiz by interactively selecting a portion of said EPG data associated with said game or quiz, the more information concerning varying said game or quiz on a program-to-program basis, the more information including information indicative of the game or quiz relating to the program and the product, the game or quiz being a game or quiz in which the viewer may participate, and the product being a product that the viewer may purchase at a reduced cost by using points accumulated according to the viewer's success in the game or quiz, the viewer's success in the game or quiz being related to the accuracy with which the viewer can predict an outcome to occur within the program, wherein the program is a live event whose subject is defined as the event transpires, and wherein the viewer can participate in the game or quiz before and after start of transmission of the program data for the program related to the game for reception by the user terminal device;
transmit said sports program and said game or quiz relating to said sports program for reception by said first and second user terminal devices,
wherein said first privilege data represents a first number of points provided, as a privilege, to the first viewer and said second privilege data represents a second number of points provided, as a privilege, to the second viewer, based on participation of the first and second viewers, respectively, in the game or quiz relating to the program,
wherein the first and second number of points is dependent upon a timing relationship between a time at which the first and second viewers cause, respectively, the first and second user terminal devices to generate entry data for the game or quiz and a time at which transmission of the program related to the game or quiz for reception by the first and second user terminal devices starts,
wherein, when the entry data for the game or quiz is caused to be generated before the start of transmission of the program data for the program related to the game or quiz, a first number of points is providable to the first and second viewers as the privilege and, when the entry data for the game is caused to be generated after the start of transmission of the program data for the program related to the game or quiz, a second number of points is providable to the first and second viewers as the privilege, wherein the first number of points exceeds the second number of points;
generate result data indicative of results of said game or quiz and cause information indicative of said results to be supplied to the first and second user terminal devices,
wherein said information indicative of said results indicates said second viewer obtains a right to purchase the product using the second privilege if the first viewer declines to purchase the product using the first privilege.

18. An interactive privilege supply system as claimed in claim 17, wherein said result data includes ranking information, wherein said ranking information indicates that the first viewer ranked higher than the second viewer.

19. An interactive privilege supply system as claimed in claim 17, wherein said privilege supply device is further operable to receive from said product supply device royalties for product privilege purchases made by any of the first and second viewers.

20. An interactive privilege supply system as claimed in claim 17, wherein said second viewer obtains another right to purchase the product using a fraction of the second privilege independent of whether the first viewer declines to purchase the product using the first privilege.

21. An interactive privilege supply system as claimed in claim 20, wherein said privilege supply device is further operable to receive from said product supply device royalties for product privilege purchases made by any of the first and second viewers.

* * * * *